(12) United States Patent
Park

(10) Patent No.: US 11,620,648 B2
(45) Date of Patent: Apr. 4, 2023

(54) PAYMENT METHOD AND SYSTEM THROUGH GENERATION OF ONE-TIME PAYMENT-ONLY NUMBER OF REAL CARD LINKED WITH APPLICATION

(71) Applicant: Hee Young Park, Seoul (KR)

(72) Inventor: Hee Young Park, Seoul (KR)

( * ) Notice: Subject to any disclaimer, the term of this patent is extended or adjusted under 35 U.S.C. 154(b) by 0 days.

(21) Appl. No.: 17/500,635

(22) Filed: Oct. 13, 2021

(65) Prior Publication Data
US 2023/0053310 A1 Feb. 16, 2023

(30) Foreign Application Priority Data

Aug. 12, 2021 (KR) .......................... 10-2021-0106716

(51) Int. Cl.
*G06Q 30/00* (2012.01)
*G06Q 20/38* (2012.01)
(Continued)

(52) U.S. Cl.
CPC ......... *G06Q 20/385* (2013.01); *G06Q 20/202* (2013.01); *G06Q 20/204* (2013.01);
(Continued)

(58) Field of Classification Search
None
See application file for complete search history.

(56) References Cited

U.S. PATENT DOCUMENTS 8,380,177 B2 * 2/2013 Laracey ............... G06Q 20/108
455/414.1
8,805,725 B2 * 8/2014 Calman ............... G06Q 20/405
705/16

(Continued)

FOREIGN PATENT DOCUMENTS

| EP | 1077436 A2 * | 2/2001 | ............. G06Q 20/28 |
| JP | 2006113816 A * | 4/2006 | ............. G06Q 40/00 |

(Continued)

OTHER PUBLICATIONS

US Payments Forum. Mobile and Digital Wallets: U.S. Landscape and Strategic Considerations for Merchants and Financial Institutions. (Jan. 2018). Retrieved online Jan. 7, 2022. https://www.uspaymentsforum.org/wp-content/uploads/2018/01/Mobile-Digital-Wallets-WP-FINAL-January-2018.pdf (Year: 2018).*

(Continued)

*Primary Examiner* — James A Reagan
(74) *Attorney, Agent, or Firm* — Millen, White, Zelano & Branigan, PC; Ryan Pool

(57) ABSTRACT

Provided are a payment method and system through generation of a one-time payment-only number of a real card linked with an application, wherein in order to make payment safely by generating a one-time payment-only number every payment without leaving card information of a user in a provider's payment terminal or by using the generated one-time payment-only number, when a real card is linked with an application installed on a user terminal and the payment terminal recognizes the real card, a user signature input window, and transaction information about payment performed with a one-time payment-only number generated by a card company server are displayed on a screen of the application of the user terminal, and payment is performed when a signature of the user is input to the signature input window.

21 Claims, 32 Drawing Sheets

(51) Int. Cl.
  *G06Q 20/20* (2012.01)
  *H04L 9/32* (2006.01)
  *G06Q 20/40* (2012.01)
  *G06Q 40/02* (2023.01)
  *G06Q 30/0251* (2023.01)

(52) U.S. Cl.
  CPC ....... *G06Q 20/209* (2013.01); *G06Q 20/3825* (2013.01); *G06Q 20/405* (2013.01); *G06Q 30/0253* (2013.01); *G06Q 40/02* (2013.01); *H04L 9/3247* (2013.01)

(56) References Cited

U.S. PATENT DOCUMENTS

| | | | | |
|---|---|---|---|---|
| 9,195,984 | B1* | 11/2015 | Spector | G06Q 20/322 |
| 9,514,460 | B2* | 12/2016 | Lawless | G06Q 20/401 |
| 9,558,605 | B2* | 1/2017 | Lynch | G07C 9/27 |
| 9,646,450 | B2* | 5/2017 | Melik-Aslanian | G06Q 20/00 |
| 9,818,113 | B2 | 11/2017 | Park et al. | |
| 9,940,623 | B2* | 4/2018 | Lawless | G06Q 20/405 |
| 10,275,750 | B2* | 4/2019 | Castrechini | G06Q 20/322 |
| 10,346,848 | B2* | 7/2019 | Ziat | G06Q 20/227 |
| 10,657,531 | B1* | 5/2020 | Arumugam | G07G 1/0009 |
| 11,049,110 | B2* | 6/2021 | Ver Hulst | G06Q 40/02 |
| 11,263,604 | B2* | 3/2022 | Yan | H04L 9/0637 |
| 2002/0138445 | A1* | 9/2002 | Laage | G06Q 20/3558 |
| | | | | 705/67 |
| 2008/0133351 | A1* | 6/2008 | White | G06Q 30/0226 |
| | | | | 705/14.27 |
| 2012/0296726 | A1* | 11/2012 | Dessert | G06Q 30/0238 |
| | | | | 705/14.27 |
| 2013/0159186 | A1* | 6/2013 | Brudnicki | H04W 12/068 |
| | | | | 705/44 |
| 2013/0204793 | A1* | 8/2013 | Kerridge | G06Q 20/202 |
| | | | | 705/67 |
| 2014/0040139 | A1* | 2/2014 | Brudnicki | H04W 12/0471 |
| | | | | 705/44 |
| 2014/0052553 | A1* | 2/2014 | Uzo | G06Q 20/322 |
| | | | | 705/17 |
| 2014/0164241 | A1* | 6/2014 | Neuwirth | G06Q 20/12 |
| | | | | 705/44 |
| 2014/0258135 | A1 | 9/2014 | Park et al. | |
| 2014/0351147 | A1* | 11/2014 | Castrechini | G06Q 20/20 |
| | | | | 705/79 |
| 2014/0379584 | A1* | 12/2014 | Ward | G06Q 20/3829 |
| | | | | 705/71 |
| 2015/0046276 | A1* | 2/2015 | Artman | G06Q 20/363 |
| | | | | 705/21 |
| 2015/0120561 | A1* | 4/2015 | Ver Hulst | G06Q 20/409 |
| | | | | 705/44 |
| 2015/0136848 | A1* | 5/2015 | Lynch | G06Q 20/40 |
| | | | | 235/382 |
| 2015/0161597 | A1* | 6/2015 | Subramanian | G06Q 20/0855 |
| | | | | 705/41 |
| 2015/0227906 | A1* | 8/2015 | Castrechini | G06Q 20/42 |
| | | | | 705/16 |
| 2015/0269571 | A1* | 9/2015 | Lawless | G06Q 20/405 |
| | | | | 705/44 |
| 2015/0286998 | A1* | 10/2015 | Thackray | G06Q 20/405 |
| | | | | 705/39 |
| 2016/0358172 | A1* | 12/2016 | Ziat | G06Q 20/326 |
| 2017/0046703 | A1* | 2/2017 | Lawless | G06Q 20/3278 |
| 2017/0249667 | A1* | 8/2017 | Castrechini | G06Q 30/0268 |
| 2018/0025442 | A1* | 1/2018 | Isaacson | G06F 3/048 |
| | | | | 705/26.62 |
| 2018/0218363 | A1* | 8/2018 | Acar | G06Q 20/409 |
| 2019/0156335 | A1* | 5/2019 | Safak | G06Q 20/385 |
| 2019/0385160 | A1* | 12/2019 | Safak | G06Q 20/3227 |
| 2021/0319451 | A1* | 10/2021 | Ver Hulst | G06Q 20/409 |
| 2021/0398090 | A1* | 12/2021 | Yan | G06Q 20/02 |
| 2021/0398091 | A1* | 12/2021 | Yan | G06Q 20/065 |
| 2021/0398104 | A1* | 12/2021 | Yan | G06Q 20/4037 |
| 2022/0292468 | A1* | 9/2022 | Yan | H04L 9/0637 |
| 2022/0300918 | A1* | 9/2022 | Yan | H04L 9/0637 |
| 2022/0300919 | A1* | 9/2022 | Yan | G06Q 20/065 |

FOREIGN PATENT DOCUMENTS

| | | | | |
|---|---|---|---|---|
| JP | 2019003249 A | * | 1/2019 | ............. G06Q 20/10 |
| KR | 10-1330943 B1 | | 11/2013 | |

OTHER PUBLICATIONS

Michael Muchmore. The Best Mobile Payment Apps. (Dec. 28, 2020). Retrieved online Jan. 7, 2022. https://www.pcmag.com/picks/the-best-mobile-payment-apps (Year: 2020).*

CapitalOne. What Is a Virtual Card Number and How Does It Work? (Aug. 6, 2020). Retrieved online Jan. 7, 2022. https://www.capitalone.com/learn-grow/money-management/what-are-virtual-card-numbers/ (Year: 2020).*

* cited by examiner

PAYMENT METHOD AND SYSTEM THROUGH GENERATION OF ONE-TIME PAYMENT-ONLY NUMBER OF REAL CARD LINKED WITH APPLICATION

CROSS REFERENCE TO RELATED APPLICATION

The present application claims priority to Korean Patent Application No. 10-2021-0106716, filed Aug. 12, 2021, the entire contents of which is incorporated herein for all purposes by this reference.

BACKGROUND OF THE INVENTION

Field of the Invention

The present disclosure relates to a payment method and system through generation of a one-time payment-only number of a real card linked with an application. In particular, the present disclosure relates to a payment method and system through generation of a one-time payment-only number of a real card linked with an application, wherein in order to make payment safely by generating a one-time payment-only number every payment without leaving card information of a user in a provider's payment terminal (for example, a POS terminal), when a real card is linked with an application installed on a user terminal, such as a smartphone, and the payment terminal recognizes the real card, a user signature input window, and transaction information about payment performed with a one-time payment-only number generated by a card company server are displayed on a screen of the application of the user terminal, payment is performed when a signature of the user is input to the signature input window, the linked real card is used for payment only with the one-time payment-only number generated by the application, the one-time payment-only number is used again every payment, and it is impossible to perform payment outside the application.

Description of the Related Art

In general, many of users who purchase products or services pay purchase prices using real cards such as credit cards or check cards. Herein, the transaction method is that the user makes card payment using a real card, such as a credit card or a check card, at a payment terminal (POS terminal) in an offline store of a provider. The procedure is as follows. The user swipes a real card for payment through, touches it to, or inserts it into a reader of the payment terminal to transmit a real card number to the payment terminal. The payment terminal transmits the card number and transaction information (a payment amount, an affiliated store name of a provider) to a VAN (value-added network=enhanced service=value-added data service) company server to request payment approval. The VAN company server transmits the card number and the transaction information to a card company server to request payment approval for the transaction. The card company server checks the card number and the transaction information and gives notification of payment approval to the payment terminal via the VAN company server, thereby completing payment. However, the credit card that the user has lost or that has been stolen may be used by someone else for payment. Alternatively, card information, such as a card number, an expiration date, and a CVC number, may be stolen by someone to make an illegal payment at some online sites where payment can be made without passwords. The total amount of global credit card fraud caused by such credit card theft reached about 33 trillion won (Bank of Korean statistics) in 2018.

In the related art, to solve a problem of such credit card theft, there is Korean Patent No. 10-1330943 (registration date: 12 Nov. 2013), titled "PAYMENT METHOD USING ONE-TIME CARD INFORMATION", wherein as shown in FIG. 1, a payment device (=user terminal) uses an application to be issued with a one-time payment-only number from a card company server and make payment. In the related art, however, if someone hacks or steals user's one-time card information (=card number) or real card number and uses it for an illegal payment, the user recognizes this after the theft case occurs. Therefore, the occurrence of the case cannot be prevented in advance, and the payment price is paid within a payment limit. Thus, even when the provider accidentally or intentionally inputs an excessive payment amount, the user may not be aware of this in advance and the payment may be approved. In addition, in the process of performing payment, rather than touching the real card to the payment terminal or inserting the real card into the payment terminal, which is familiar to the provider, the payment method using only the payment device (=user terminal) may cause confusion and inconvenience to the provider and the user, resulting in payment delay.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent No. 10-1330943 (registration date: 12 Nov. 2013) "PAYMENT METHOD USING ONE-TIME CARD INFORMATION".

SUMMARY OF THE INVENTION

The present disclosure is directed to maximize user convenience and financial safety by introducing an innovative payment method having the advantages as follows: maintaining a familiar card payment method in which a user touches a real card to a payment terminal of a provider or inserts the real card into the payment terminal in an offline store; generating and using a one-time payment-only number through an exclusive application installed on a user terminal to prevent a real card number from being exposed, thereby enhancing security of personal information. In addition, in order to solve a problem that when a real card or a real card number is stolen and used by someone, a user recognizes the fact through a payment notification SMS message after the theft case, that is, after payment is already completed, the present disclosure is directed to providing a payment method and system through generation of a one-time payment-only number of a real card linked with an application, wherein a user terminal is linked with a real card so that the user is able to confirm the transaction information (a payment amount, a payment item, and an affiliated store name of a provider) about for all payment approval signature requests related to the real card that the user owns, in advance through the user terminal and writes the signature to determine whether to approve payment by the user personally, and the user owns a real synchronization card linked with the application from the time of initial issuance and conveniently makes payment in the payment terminal in the same manner as with a real card.

According to the present disclosure, there is provided a payment method through generation of a one-time payment-only number of a real card linked with an application, the payment method including: inputting real card information, such as a real card number, of a user to the application installed on a user terminal, and transmitting the real card information from the application to a card company server to complete setting of a link between the application of the user terminal and the real card; inputting transaction information, such as a payment amount for the product or the service that the user purchases from a provider, to a payment terminal; recognizing the real card of the user by the payment terminal, and transmitting the real card number from the real card to the payment terminal; transmitting the transaction information from the payment terminal to a VAN company server, and making a request for transaction approval from the payment terminal to the VAN company server; making a request for generation of the one-time payment-only number from the application to the card company server; generating, by the card company server, the one-time payment-only number that is used for transaction approval with respect to the real card number and the transaction information; transmitting the one-time payment-only number from the card company server to the application; transmitting the transaction information from the VAN company server to the application of the user terminal, making a request to the user for confirmation and a signature, and displaying the transaction information and a signature input window to the user through the application of the user terminal; inputting the signature of the user to the signature input window of the application of the user terminal; transmitting the signature of the user from the application of the user terminal to the VAN company server; transmitting the transaction information and the signature of the user from the VAN company server to the card company server, and making a request for transaction approval from the VAN company server to the card company server; transmitting an approval number from the card company server to the VAN company server when the card company server approves transaction, and giving notification of transaction approval from the card company server to the VAN company server; giving notification of payment completion from the VAN company server to the application of the user terminal, and outputting a transaction receipt screen to the user terminal; transmitting the one-time payment-only number and the approval number from the VAN company server to the payment terminal, and giving notification of transaction approval from the VAN company server to the payment terminal; and outputting a transaction receipt to be provided to the user from the payment terminal.

According to the present disclosure, the payment method and system through generation of a one-time payment-only number of a real card linked with an application may have effects as follows. First, by adopting a method in which a user touches a real card to a payment terminal of a provider or inserts the real card into the payment terminal in an offline store in the same manner as in the related art, the payment method and system are convenient for both the provider and the user to use. Second, the one-time payment-only number is generated using an exclusive application installed on the user terminal and is used, so that the real card number can be prevented from being exposed to the outside as much as possible and security of personal information can be enhanced. Third, in order to solve the problem that when a real card or a real card number is stolen and is used by someone, the user recognizes the fact through a payment notification SMS message after the theft case, that is, after payment is already completed, the user terminal is linked with the real card so that the user can confirm the transaction information (a payment amount, a payment item, and an affiliated store name of a provider) about all payment requests related to the real card that the user owns, in advance through the user terminal and writes the signature to determine whether to approve payment by the user personally, thereby recognizing illegal card theft attempts in advance and blocking the same. Fourth, the user can own a real synchronization card linked with the application from the time of initial issuance and can conveniently make payment in the payment terminal in the same manner as with a real card. Fifth, the card registered in the application can be temporarily suspended and transaction can be conducted only with the linked application and the one-time payment-only number. When handwriting input of the card number is required, transaction can be conducted by inputting the one-time transaction number, so that even when the issued card is leaked to the outside, it is impossible to use the card outside, thereby preventing theft and enhancing security.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
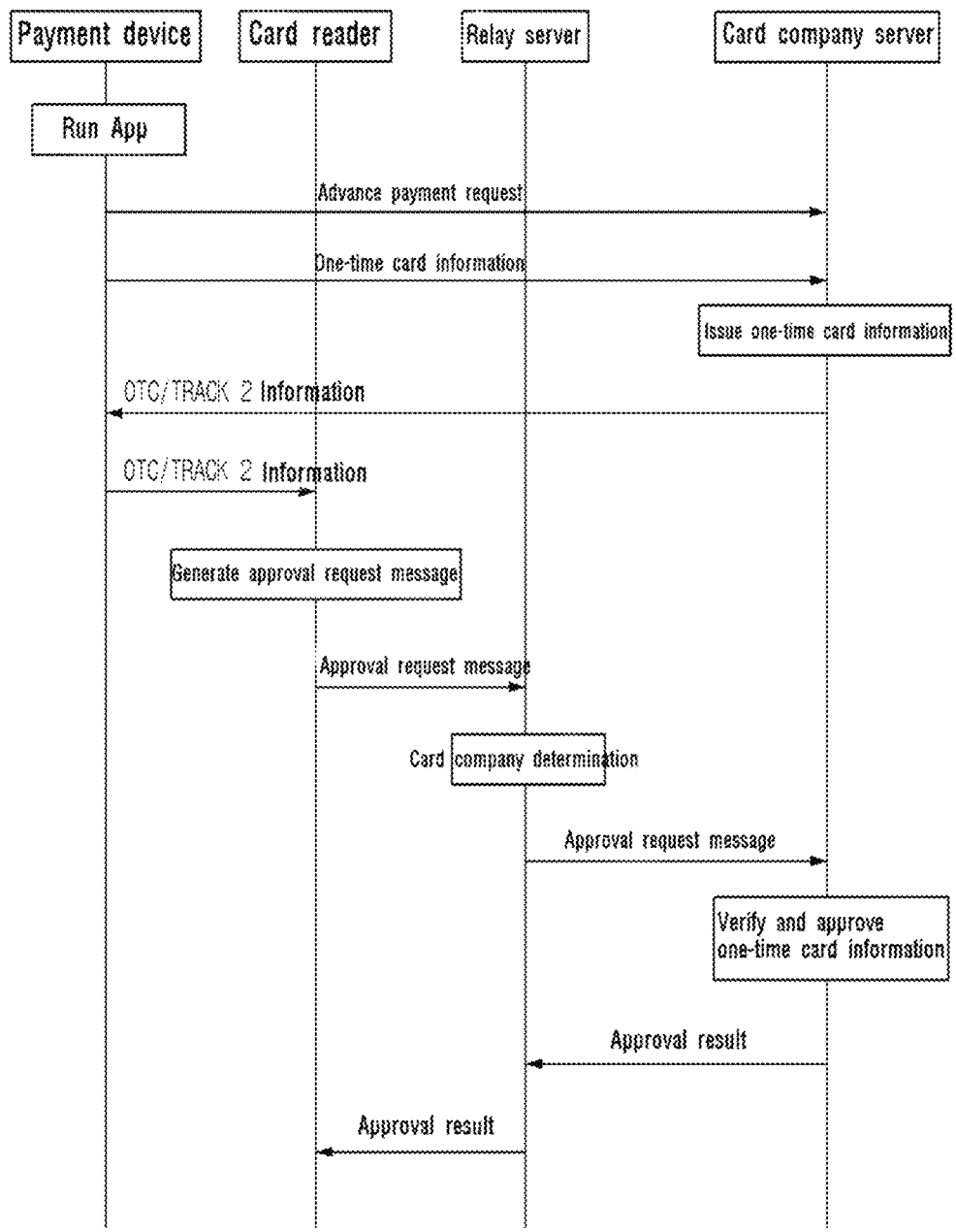
FIG. 1 is a flowchart illustrating a payment method using one-time card information in the related art.

The accompanying drawings and the content shown in the drawings illustrating exemplary embodiments of the present disclosure should be referred to in order to fully understand the present disclosure, operational advantages of the present disclosure, and the objectives achieved by implementation of the present disclosure. Hereinafter, exemplary embodiments of the present disclosure will be described with reference to the accompanying drawings to describe the present disclosure in detail.

Figure 2:
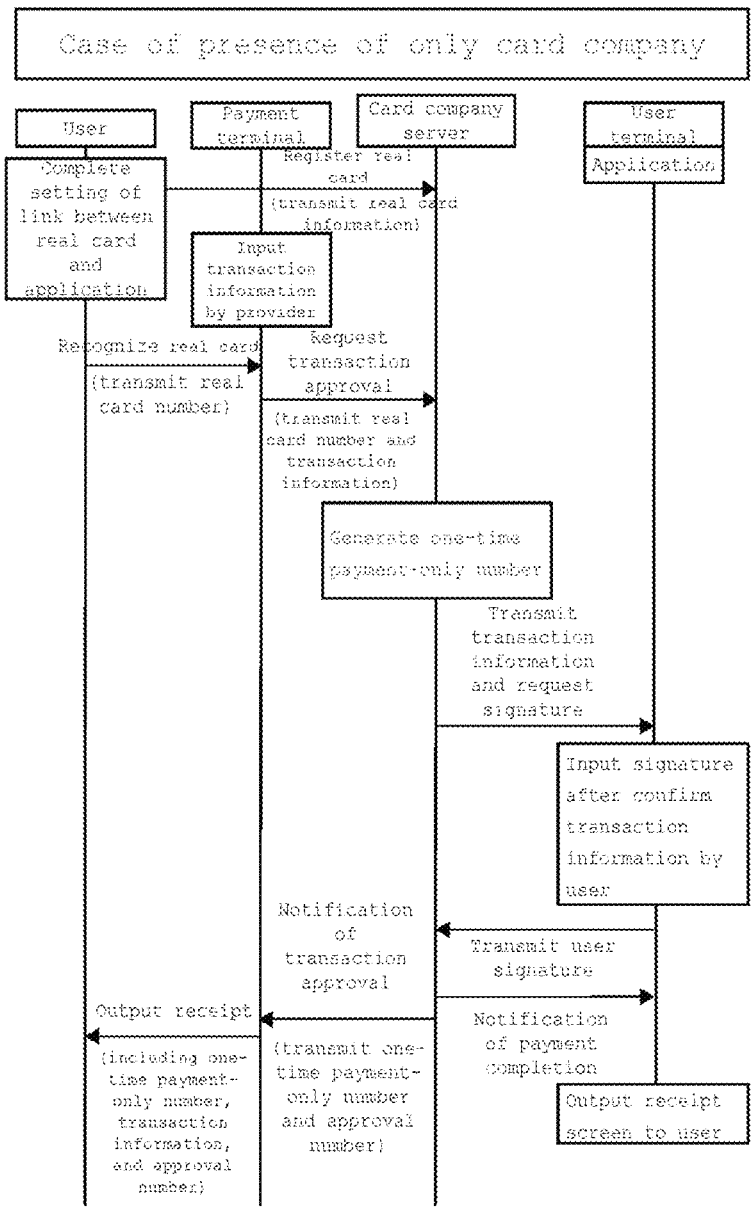
FIG. 2 is a flowchart illustrating a case in which there is only a card company server, in a payment method through generation of a one-time payment-only number of a real card linked with an application, according to an embodiment of the present disclosure.

According to a first embodiment of the present disclosure, there is provided a payment method through generation of a one-time payment-only number of a real card linked with an application, as shown in FIG. 2, the payment method including: inputting real card information, such as a real card number, of a user to the application installed on a user terminal, and transmitting the real card information from the application to a card company server to complete setting of a link between the application of the user terminal and the real card; inputting transaction information, such as a payment amount for the product or the service that the user purchases from a provider, to a payment terminal; recognizing the real card of the user by the payment terminal, and transmitting the real card number from the real card to the payment terminal; transmitting the real card number and the transaction information from the payment terminal to the card company server, and making a request for transaction approval from the payment terminal to the card company server; generating, by the card company server, the one-time payment-only number that is used for transaction approval with respect to the real card number and the transaction information; transmitting the transaction information from the card company server to the application of the user terminal, making a request to the user for confirmation and a signature, and displaying the transaction information and a signature input window to the user through the application of the user terminal; inputting the signature of the user to the signature input window of the application of the user terminal; transmitting the signature of the user from the application of the user terminal to the card company server; transmitting an approval number and the one-time payment-only number from the card company server to the application of the user terminal when the card company server approves transaction, giving notification of payment completion, and outputting a transaction receipt screen to the user terminal; transmitting the one-time payment-only number and the approval number from the card company server to the payment terminal, and giving notification of transaction approval; and outputting a transaction receipt to be provided to the user from the payment terminal.

Figure 3:
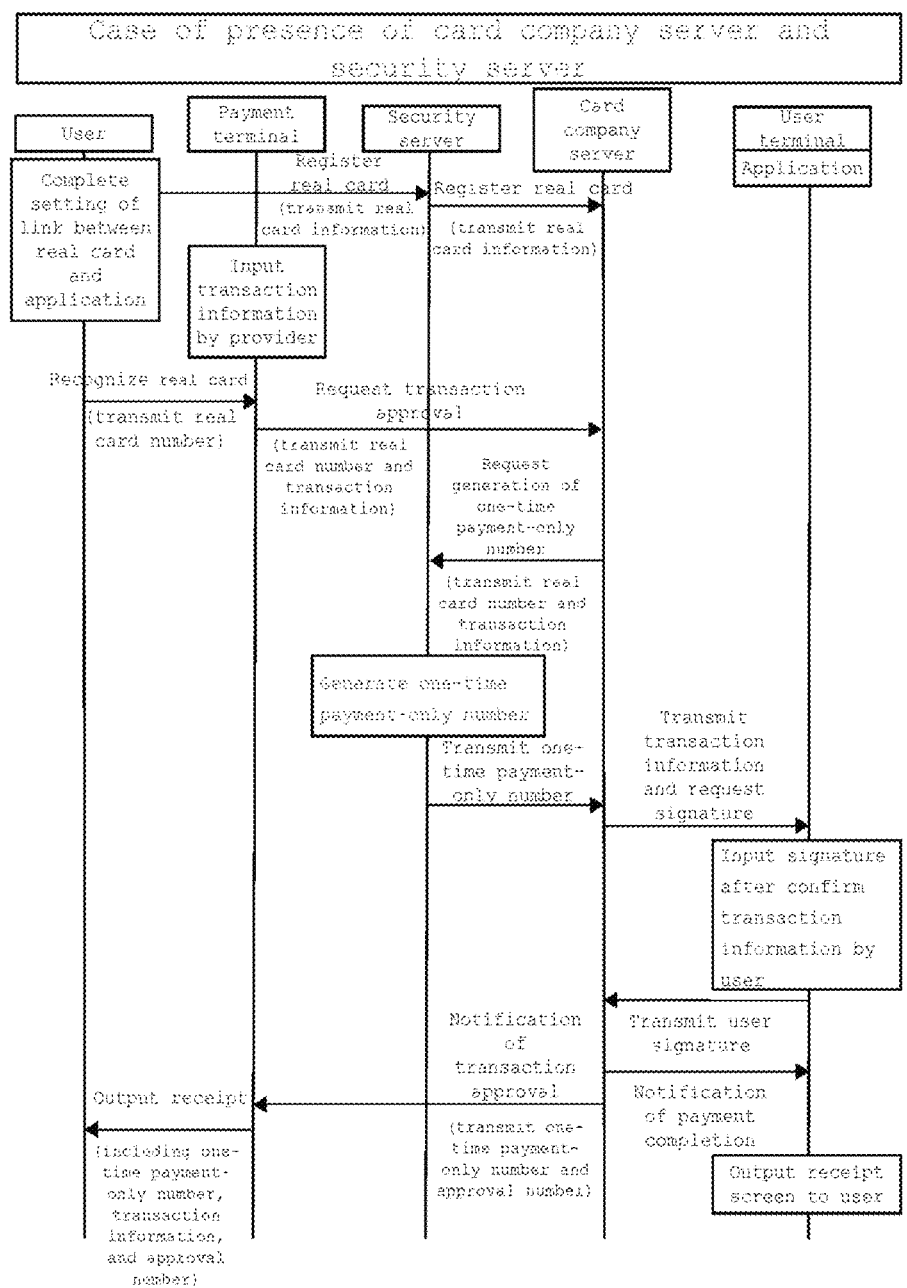
FIG. 3 is a flowchart illustrating a case in which there are a card company server and a security server, in a payment method through generation of a one-time payment-only number of a real card linked with an application, according to an embodiment of the present disclosure.

According to a second embodiment of the present disclosure, there is provided a payment method through generation of a one-time payment-only number of a real card linked with an application, as shown in FIG. 3, the payment method including: inputting real card information, such as a real card number, of a user to the application installed on a user terminal, transmitting the real card information from the application to a security server, and transmitting the real card information from the security server to a card company server to complete setting of a link between the application of the user terminal and the real card; inputting transaction information, such as a payment amount for the product or the service that the user purchases from a provider, to a payment terminal; recognizing the real card of the user by the payment terminal, and transmitting the real card number from the real card to the payment terminal; transmitting the real card number and the transaction information from the payment terminal to the card company server, and making a request for transaction approval from the payment terminal to the card company server; transmitting the real card number and the transaction information from the card company server to the security server, and making a request for generation of the one-time payment-only number; generating, by the security server, the one-time payment-only number that is used for transaction approval with respect to the real card number and the transaction information; transmitting the one-time payment-only number from the security server to the card company server; transmitting the transaction information from the card company server to the application of the user terminal, making a request to the user for confirmation and a signature, and displaying the transaction information and a signature input window to the user through the application of the user terminal; inputting the signature of the user to the signature input window of the application of the user terminal; transmitting the signature of the user from the application of the user terminal to the card company server; approving transaction by the card company server, transmitting an approval number from the card company server to the application of the user terminal for notification of payment completion, and outputting a transaction receipt screen to the user terminal; transmitting the one-time payment-only number and the approval number from the card company server to the payment terminal, and giving notification of transaction approval from the card company server to the payment terminal; and outputting a transaction receipt to be provided to the user from the payment terminal.

Figure 4:
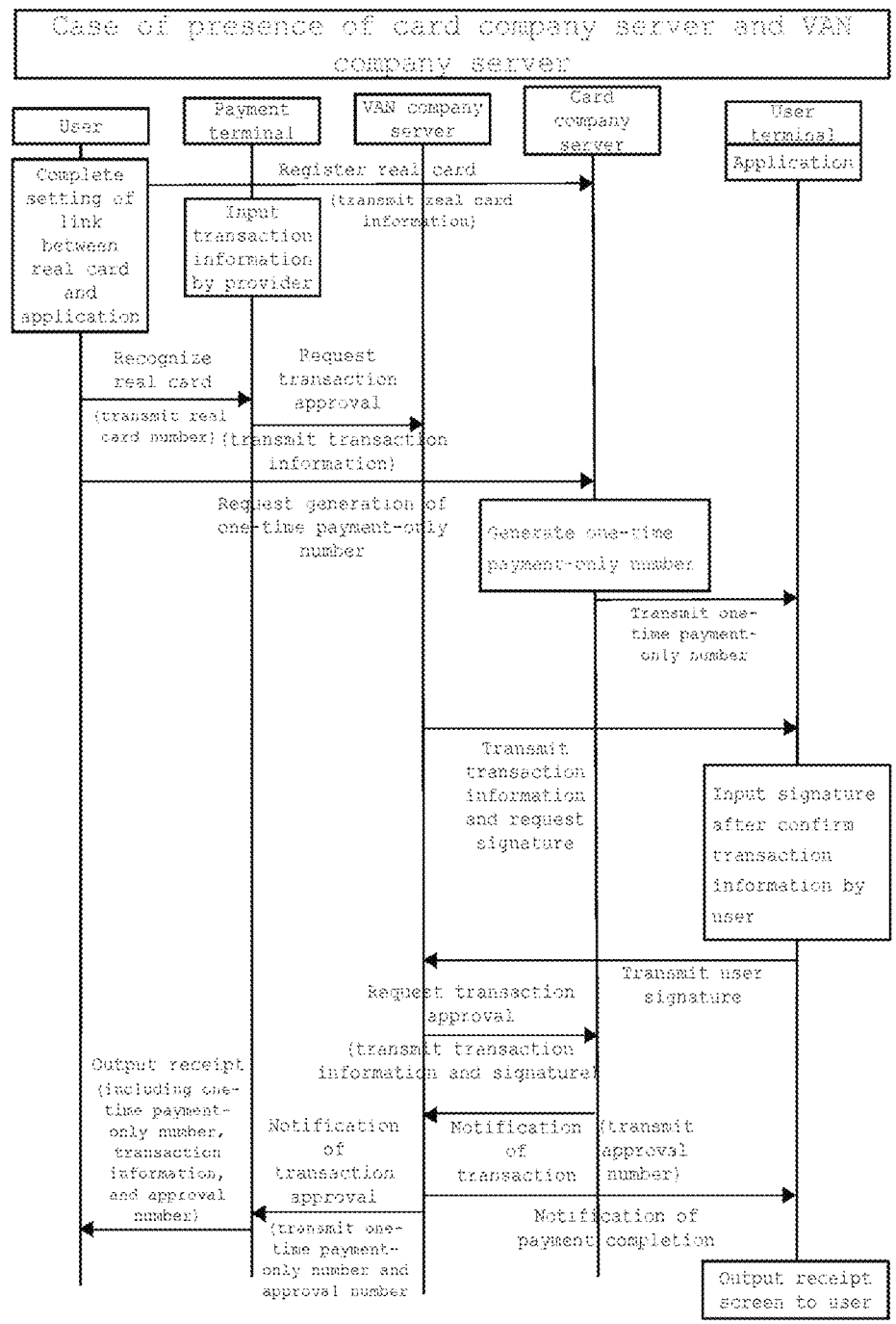
FIG. 4 is a flowchart illustrating a case in which there are a card company server and a VAN company server, in a payment method through generation of a one-time payment-only number of a real card linked with an application, according to an embodiment of the present disclosure.

According to a third embodiment of the present disclosure, there is provided a payment method through generation of a one-time payment-only number of a real card linked with an application, as shown in FIG. 4, the payment method including: inputting real card information, such as a real card number, of a user to the application installed on a user terminal, and transmitting the real card information from the application to a card company server to complete setting of a link between the application of the user terminal and the real card; inputting transaction information, such as a payment amount for the product or the service that the user purchases from a provider, to a payment terminal; recognizing the real card of the user by the payment terminal, and transmitting the real card number from the real card to the payment terminal; transmitting the transaction information from the payment terminal to a VAN company server, and making a request for transaction approval from the payment terminal to the VAN company server; making a request for generation of the one-time payment-only number from the application to the card company server; generating, by the card company server, the one-time payment-only number that is used for transaction approval with respect to the real card number and the transaction information; transmitting the one-time payment-only number from the card company server to the application; transmitting the transaction information from the VAN company server to the application of the user terminal, making a request to the user for confirmation and a signature, and displaying the transaction information and a signature input window to the user through the application of the user terminal; inputting the signature of the user to the signature input window of the application of the user terminal; transmitting the signature of the user from the application of the user terminal to the VAN company server; transmitting the transaction information and the signature of the user from the VAN company server to the card company server, and making a request for transaction approval from the VAN company server to the card company server; transmitting an approval number from the card company server to the VAN company server when the card company server approves transaction, and giving notification of transaction approval from the card company server to the VAN company server; giving notification of payment completion from the VAN company server to the application of the user terminal, and outputting a transaction receipt screen to the user terminal; transmitting the one-time payment-only number and the approval number from the VAN company server to the payment terminal, and giving notification of transaction approval from the VAN company server to the payment terminal; and outputting a transaction receipt to be provided to the user from the payment terminal.

Figure 22:
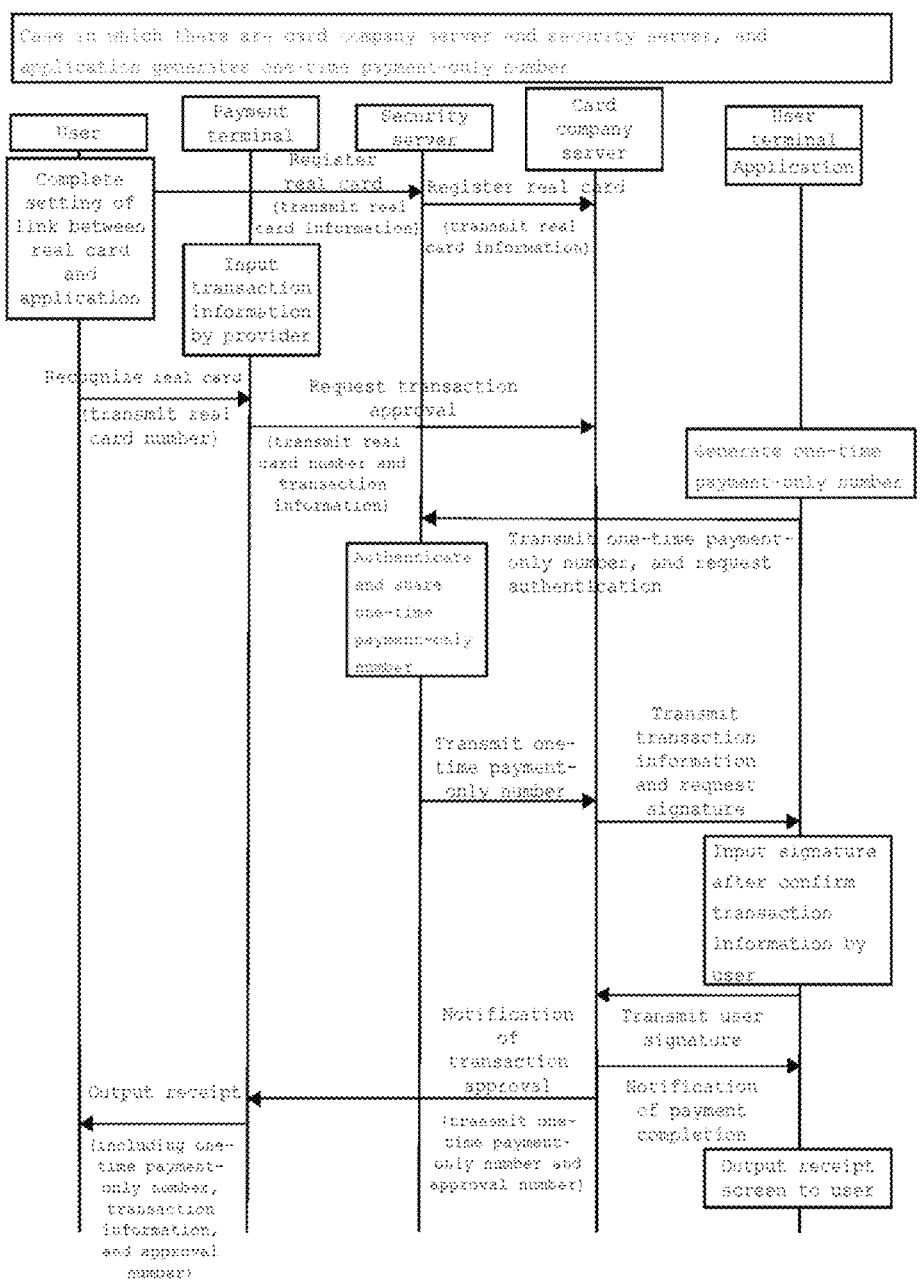
FIG. 22 is a flowchart illustrating a case in which there are a card company server and a security server and an application generates a one-time transaction number, in a payment method through generation of a one-time payment-only number of a real card linked with an application, according to an embodiment of the present disclosure.
Figure 23:
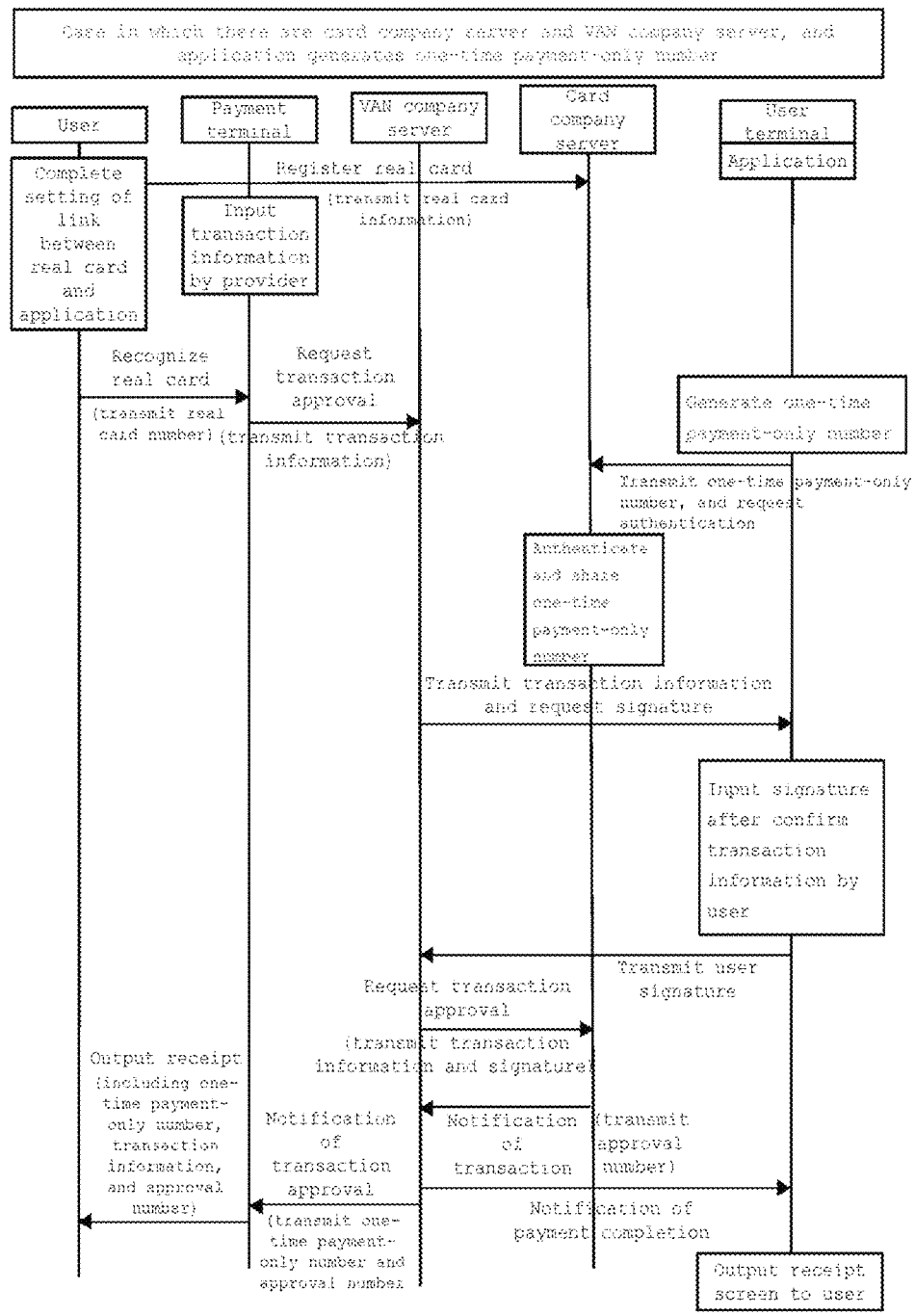
FIG. 23 is a flowchart illustrating a case in which there are a card company server and a VAN company server and an application generates a one-time transaction number, in a payment method through generation of a one-time payment-only number of a real card linked with an application, according to an embodiment of the present disclosure.
Figure 24:
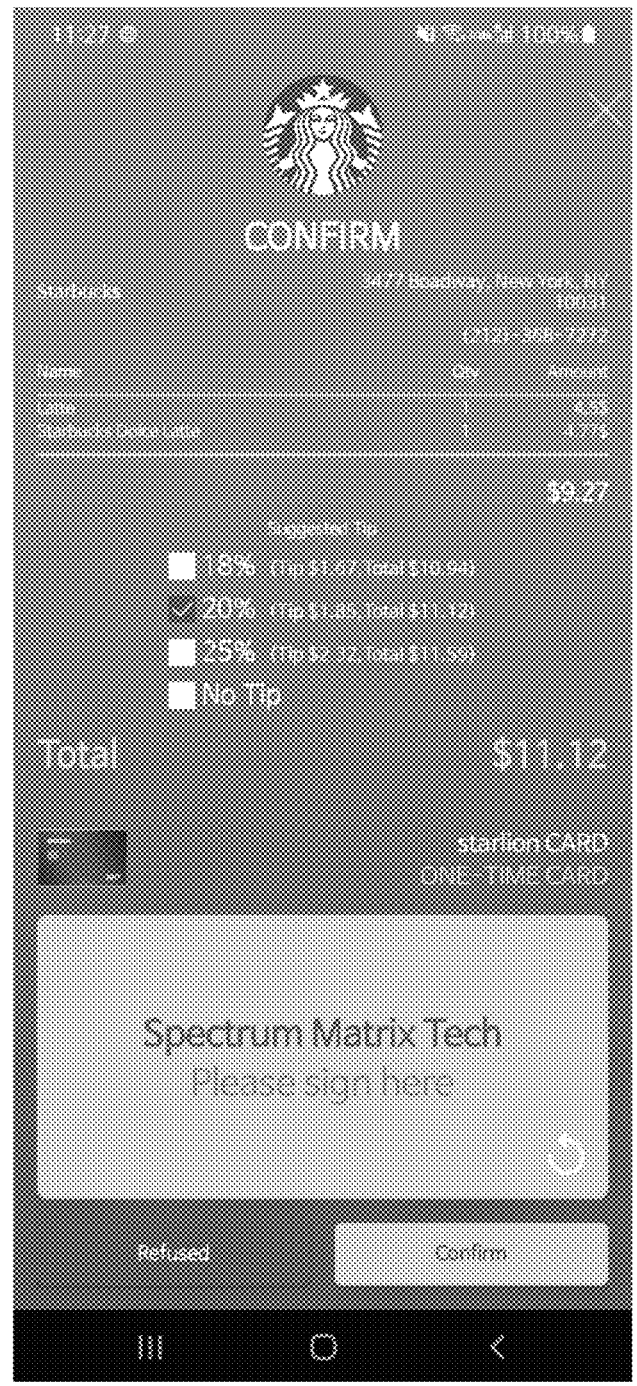
FIG. 24 is an exemplary diagram illustrating a signature input window, in which a tip is set, of a display screen of an application of a user terminal, in a payment method through generation of a one-time payment-only number of a real card linked with an application, according to an embodiment of the present disclosure.

In the first, the second, and the third embodiment, the one-time payment-only number may be generated by the application of the user terminal other than the card company server or the security server. As shown in FIGS. 22 to 24, the one-time payment-only number generated by the application is transmitted to the card company server or to the security server to request authentication. The card company server or the security server checks the received one-time payment-only number, shares the one-time payment-only number with the application, and authenticates the one-time payment-only number so that the one-time payment-only number is used for payment. The following payment processes are the same.

In the first, the second, and the third embodiment, the one-time payment-only number may be generated as a one-time payment-only number having a set limit amount in such a manner that the limit amount payable is set to be a payment amount for a product or a service that the user purchases from the provider. There are two methods. First, the card company server or the security server is set in advance such that the limit is automatically set when the one-time payment-only number is initially generated. Second, the card company server or the VAN company server receives a request that the limit is set when the user writes a transaction information confirmation signature. These will be described in more detail as follows.

Figure 5:
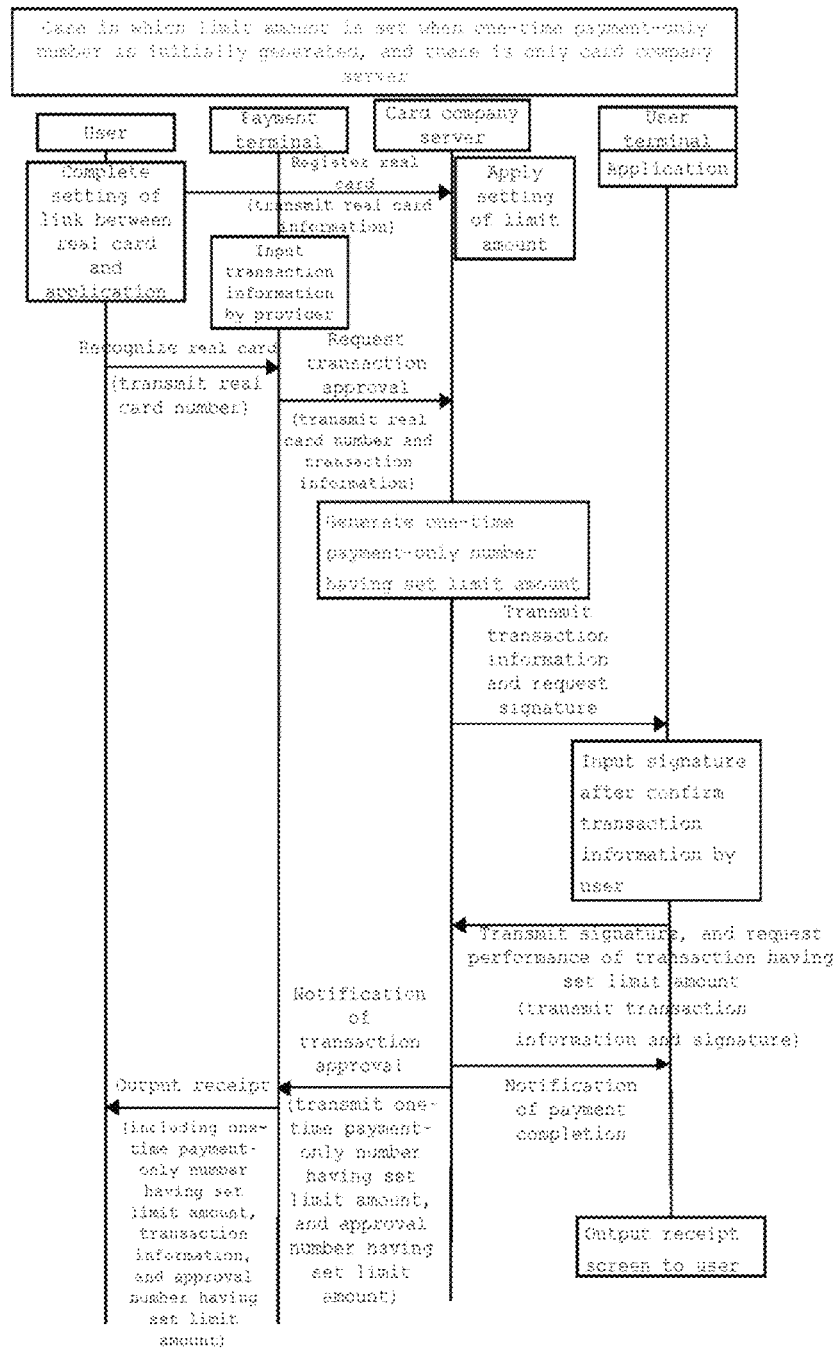
FIG. 5 is a flowchart illustrating a case in which a limit amount is set when a one-time payment-only number is initially generated and there is only a card company server, in a payment method through generation of a one-time payment-only number of a real card linked with an application, according to an embodiment of the present disclosure.

In the first method of setting the limit amount, whether to apply the setting of the limit amount may be determined by the card company server or by the security server in advance and may be automatically applied. In this case, in a payment performance method of a first embodiment in which a limit amount is set when a one-time payment-only number is initially generated, as shown in FIG. 5, setting of a limit amount in the card company server is applied in advance, and instead of a one-time payment-only number, a one-time payment-only number having the set limit amount is generated and used.

Figure 6:
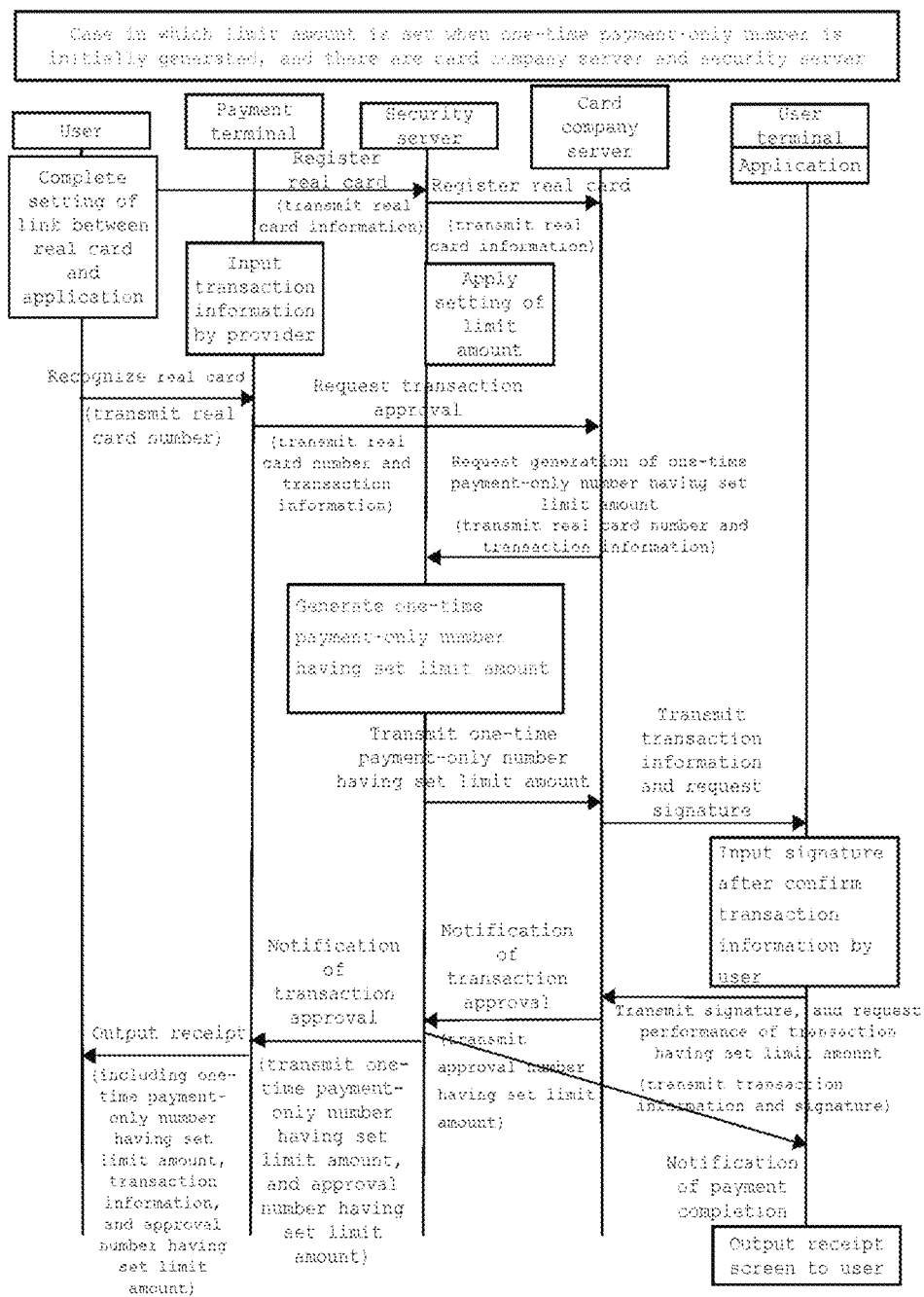
FIG. 6 is a flowchart illustrating a case in which a limit amount is set when a one-time payment-only number is initially generated and there are a card company server and a security server, in a payment method through generation of a one-time payment-only number of a real card linked with an application, according to an embodiment of the present disclosure.

In a payment performance method of a second embodiment in which a limit amount is set when a one-time payment-only number is initially generated, as shown in FIG. 6, setting of a limit amount in the security server is applied in advance, and instead of a one-time payment-only number, a one-time payment-only number having the set limit amount is generated and used.

Figure 7:
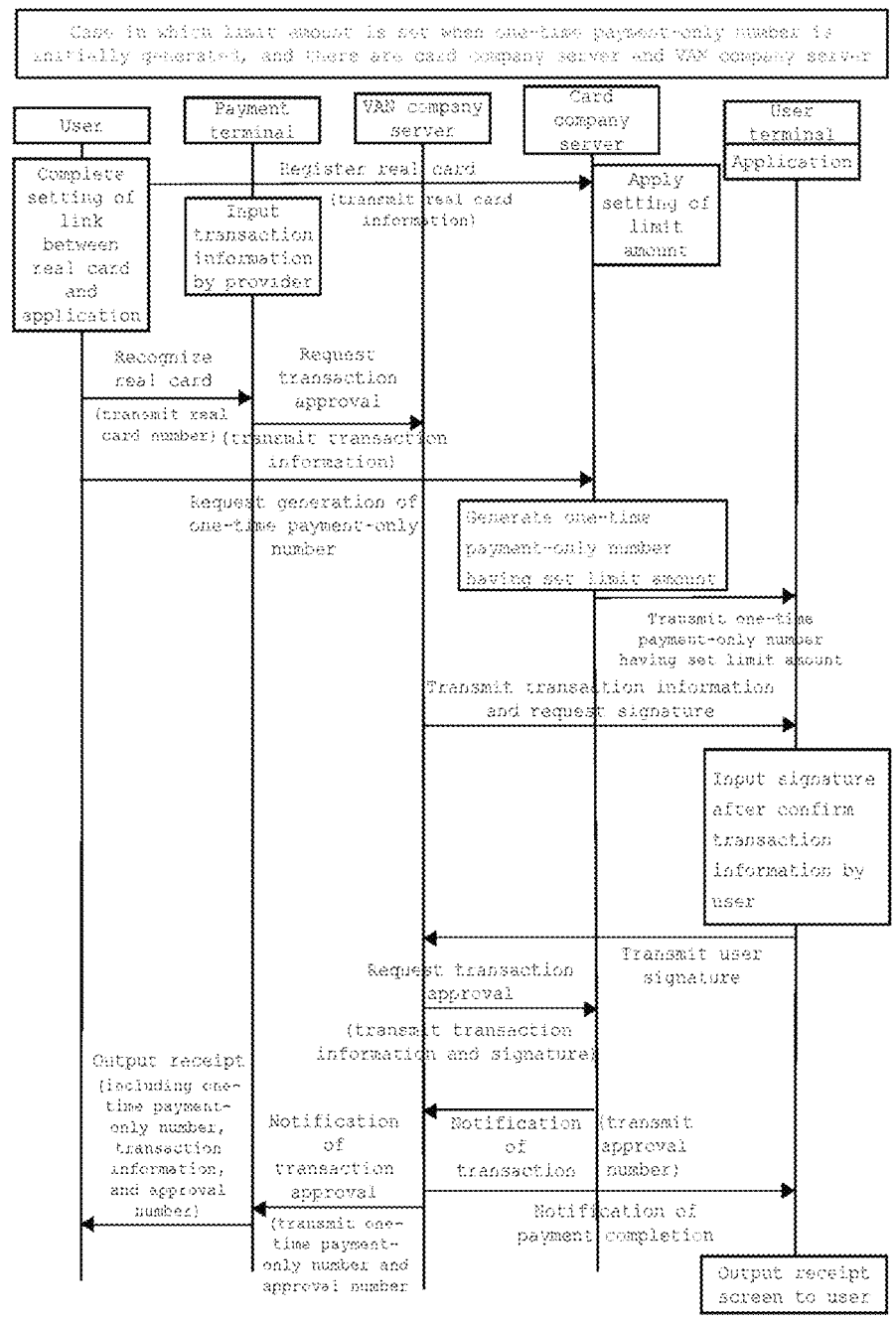
FIG. 7 is a flowchart illustrating a case in which a limit amount is set when a one-time payment-only number is initially generated and there are a card company server and a VAN company server, in a payment method through generation of a one-time payment-only number of a real card linked with an application, according to an embodiment of the present disclosure.

In a payment performance method of a third embodiment in which a limit amount is set when a one-time payment-only number is initially generated, as shown in FIG. 7, setting of a limit amount in the card company server is applied in advance, and instead of a one-time payment-only number, a one-time payment-only number having the set limit amount is generated and used.

Figure 8:
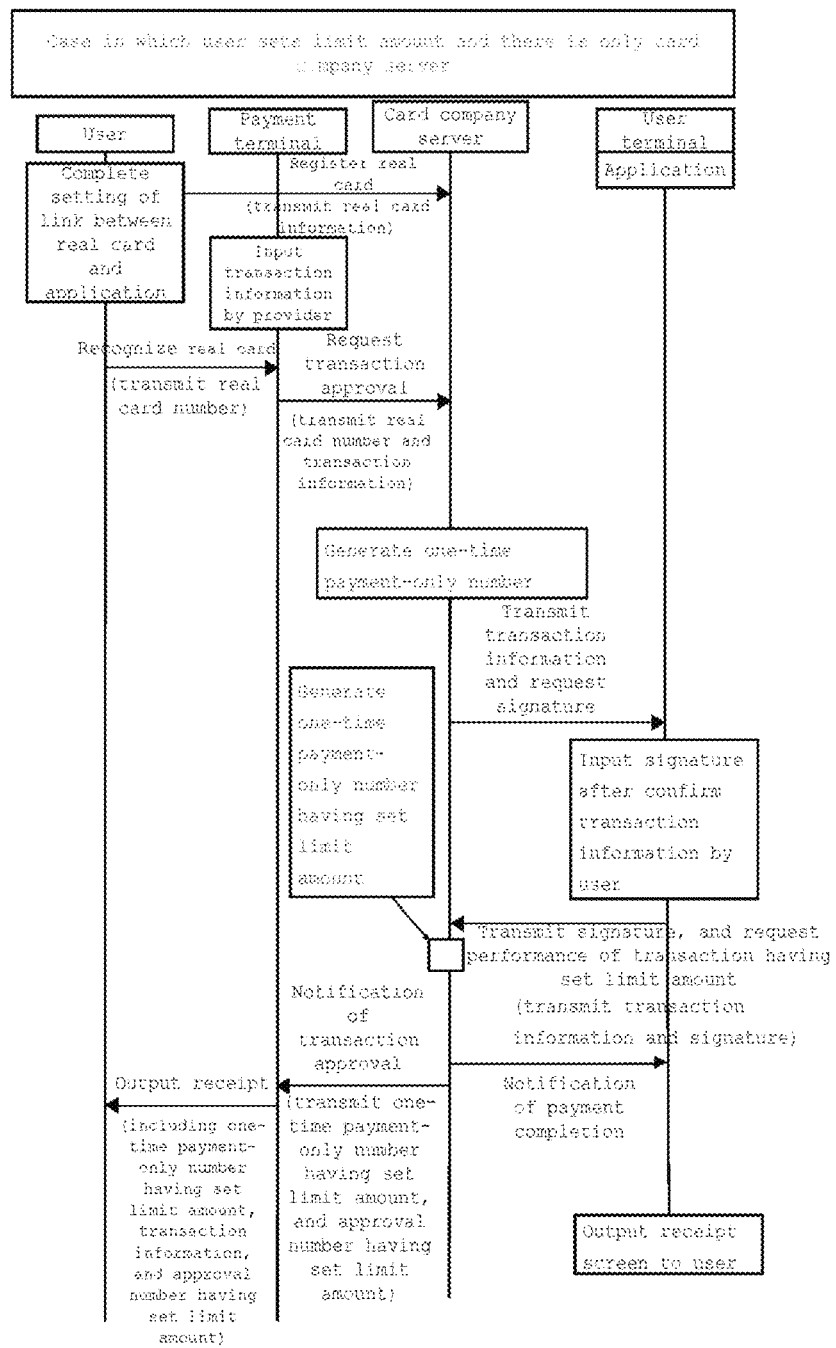
FIG. 8 is a flowchart illustrating a case in which a limit amount is set when a user writes a transaction information confirmation signature and there is only a card company server, in a payment method through generation of a one-time payment-only number of a real card linked with an application, according to an embodiment of the present disclosure.

In the second method of setting the limit amount, in the first, the second, and the third embodiment, at a step in which the user inputs the user's signature to the signature input window of the application of the user terminal in response to the request for the signature from the card company server or the VAN company server, the user may request the card company server to conduct transaction in which the limit amount of payment is set. In this case, in a first embodiment in which the user makes a request at the signature step such that the transaction in which the limit amount of payment is set is conducted, as shown in FIG. 8, after the transmitting of the signature of the user from the application of the user terminal to the card company server, the following is performed: the card company server generates a new one-time payment-only number having the set limit amount, uses the same for transaction approval, and transmits the approval number and the one-time payment-only number having the set limit amount to the application of the user terminal to give notification of payment completion, and the transaction receipt screen is output to the user terminal.

Figure 9:
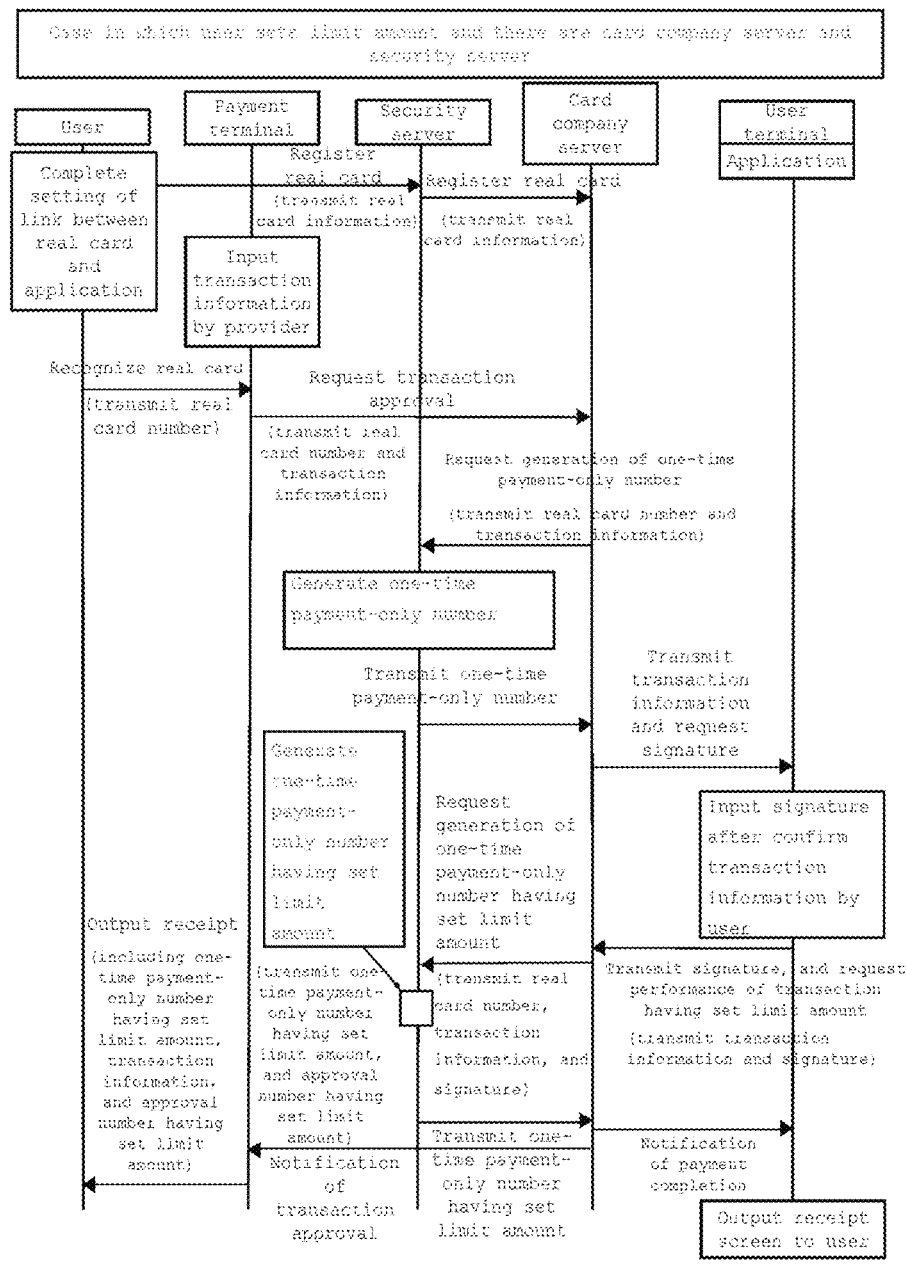
FIG. 9 is a flowchart illustrating a case in which a limit amount is set when a user writes a transaction information confirmation signature and there are a card company server and a security server, in a payment method through generation of a one-time payment-only number of a real card linked with an application, according to an embodiment of the present disclosure.

In a second embodiment in which the user makes a request at the signature step such that the transaction in which the limit amount of payment is set is conducted, as shown in FIG. 9, after the transmitting of the signature of the user from the application of the user terminal to the card company server, the following are performed. The card company server requests the security server to generate the one-time payment-only number having the set limit amount. The security server generates the one-time payment-only number having the set limit amount. The security server transmits the one-time payment-only number having the set limit amount to the card company server. The card company server approves transaction afterward, and gives notification of payment completion to the application of the user terminal, and the transaction receipt screen is output to the user terminal. The one-time payment-only number having the set limit amount and the approval number having the set limit amount are transmitted from the card company server to the payment terminal, and the card company server gives notification of transaction approval to the payment terminal. The transaction receipt to be provided to the user is output from the payment terminal.

Figure 10:
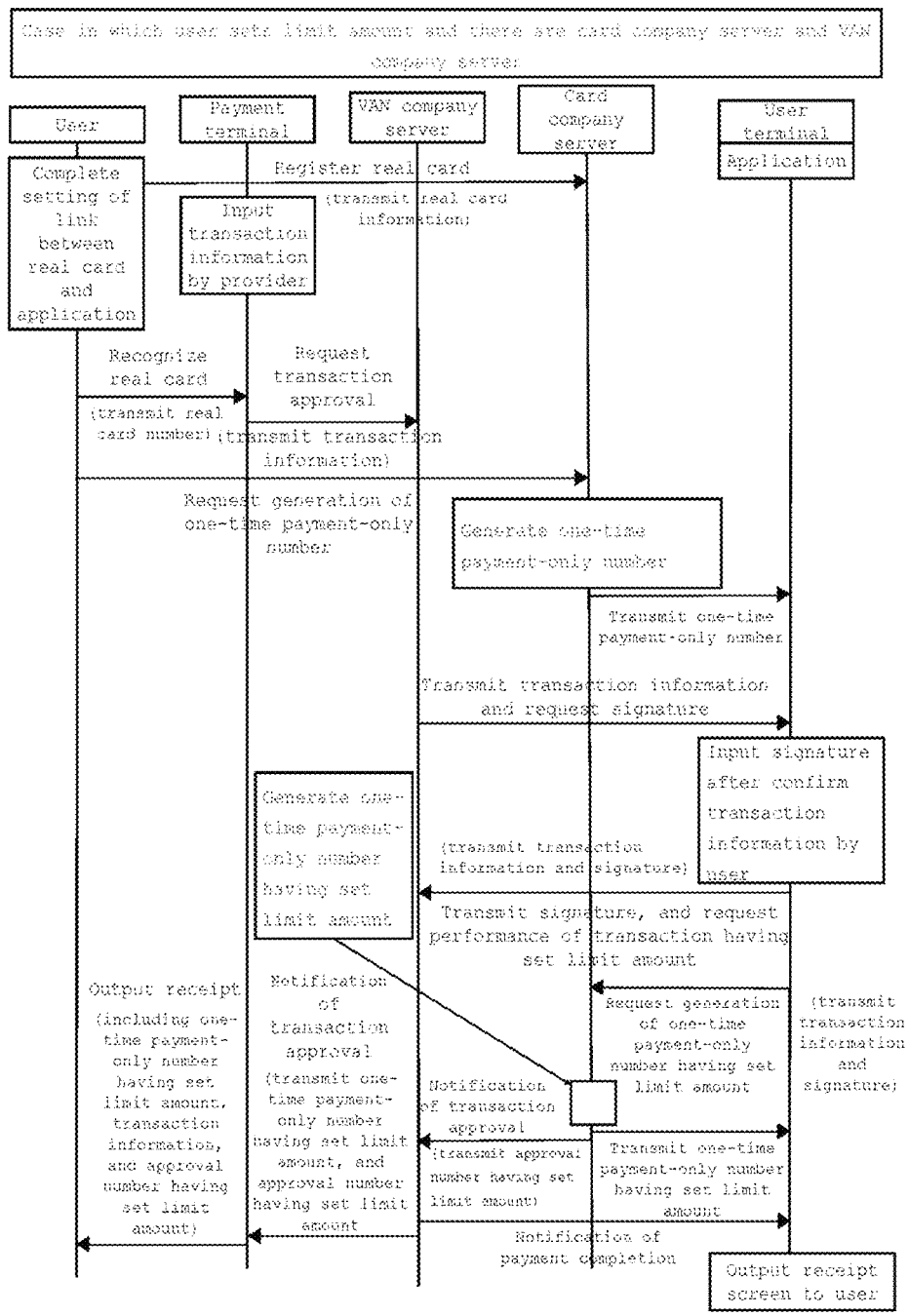
FIG. 10 is a flowchart illustrating a case in which a limit amount is set when a user writes a transaction information confirmation signature and there are a card company server and a VAN company server, in a payment method through generation of a one-time payment-only number of a real card linked with an application, according to an embodiment of the present disclosure.

In a third embodiment in which the user makes a request at the signature step such that the transaction in which the limit amount of payment is set is conducted, as shown in FIG. 10, after the transmitting of the signature of the user from the application of the user terminal to the VAN company server, the following are performed. The application requests the card company server to generate the one-time payment-only number having the set limit amount. The card company server generates the one-time payment-only number having the set limit amount. The card company server transmits the one-time payment-only number having the set limit amount to the application. The card company server approves transaction, transmits the approval number having the set limit amount to the VAN company server, and gives notification of transaction approval to the VAN company server. The VAN company server gives notification of payment completion to the application of the user terminal, and the transaction receipt screen is output to the user terminal. The approval number having the set limit amount is transmitted from the VAN company server to the payment terminal, and the VAN company server gives notification of transaction approval to the payment terminal. The transaction receipt to be provided to the user is output from the payment terminal.

The size of the limit amount may be automatically set to be the same amount each time as the amount in the transaction information that the provider inputs to the payment terminal.

Figure 19:
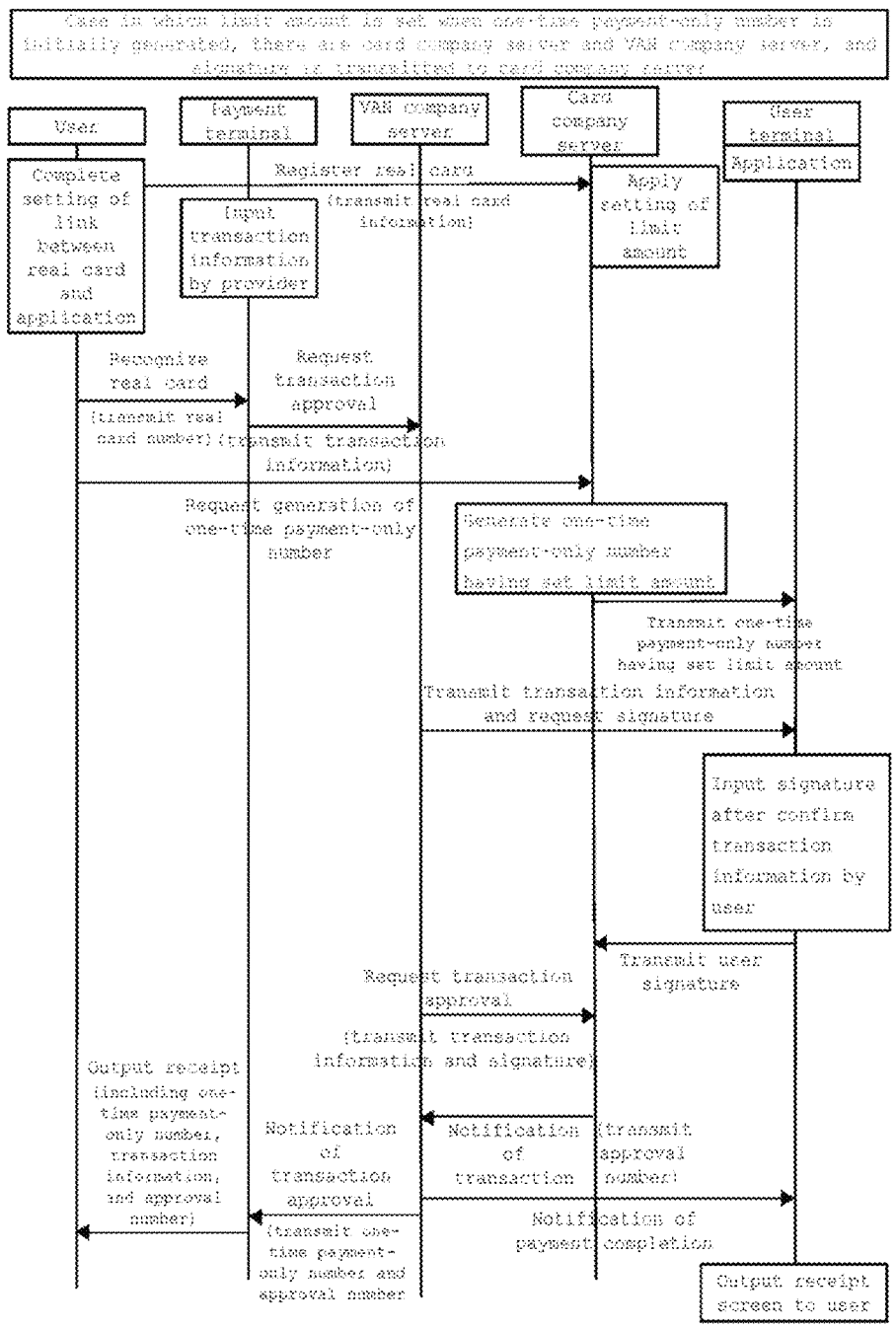
FIG. 19 is a flowchart illustrating a case in which a limit amount is set when a one-time payment-only number is initially generated, there are a card company server and a VAN company server, and a user signature is transmitted to a card company server, in a payment method through generation of a one-time payment-only number of a real card linked with an application, according to an embodiment of the present disclosure.
Figure 20:
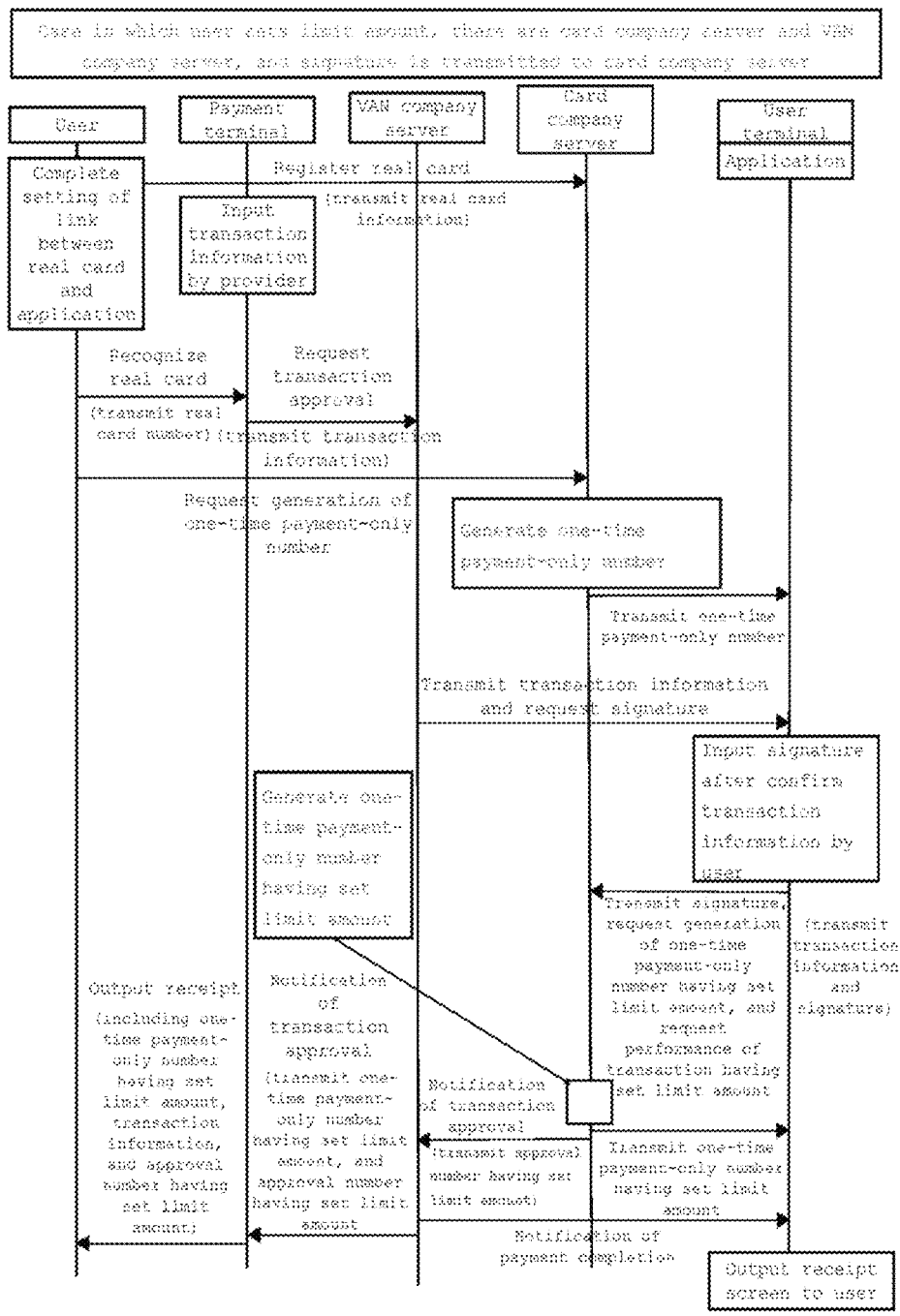
FIG. 20 is a flowchart illustrating a case in which a limit amount is set when a user writes a transaction information confirmation signature, there are a card company server and a VAN company server, and a user signature is transmitted to a card company server, in a payment method through generation of a one-time payment-only number of a real card linked with an application, according to an embodiment of the present disclosure.
Figure 21:
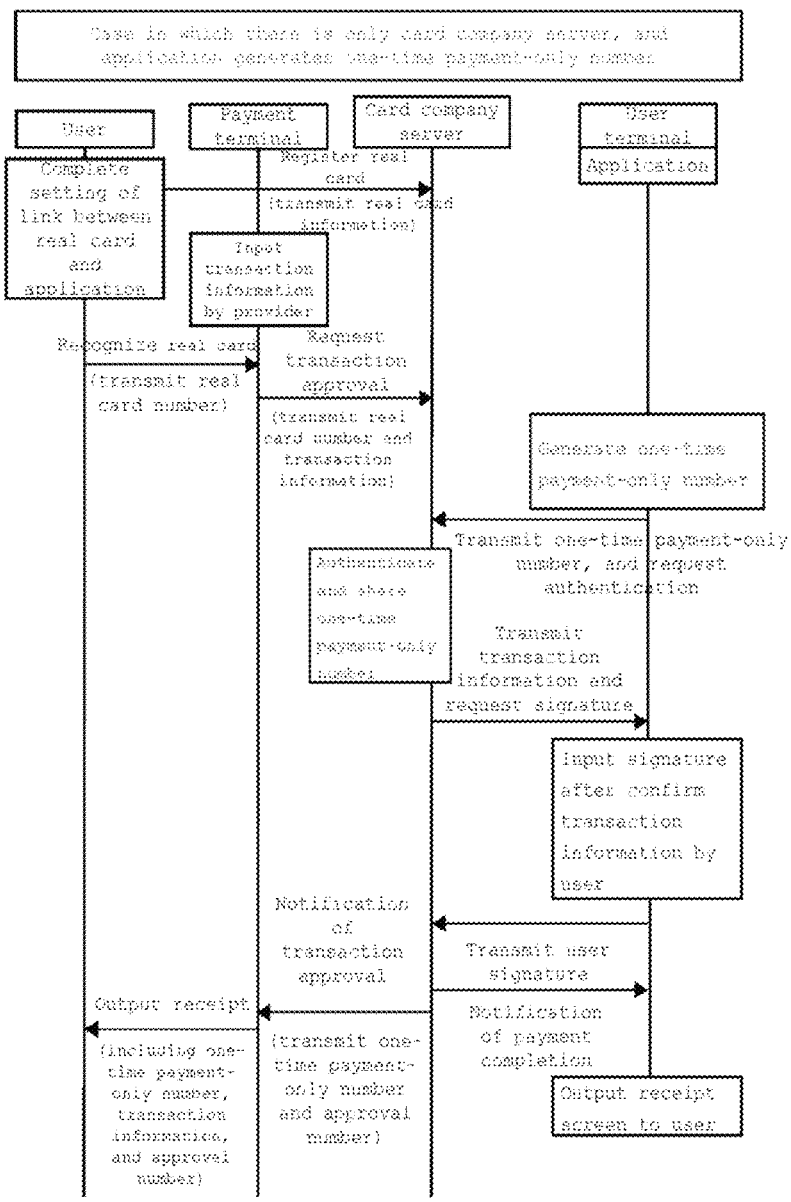
FIG. 21 is a flowchart illustrating a case in which there is only a card company server and an application generates a one-time transaction number, in a payment method through generation of a one-time payment-only number of a real card linked with an application, according to an embodiment of the present disclosure.

In addition, as shown in FIGS. 19 to 21, unlike the third embodiment in which the application transmits the user's signature to the VAN company server, there is a method of conducting transaction by transmitting the user's signature directly to the card company server.

The first, the second, and the third embodiment will be described in more detail as follows.

The real card may be a general credit card or check card.

The real card may be a real synchronization card that is formed to be linked with the application from the time of initial issuance.

The one-time payment-only number may be a one-time card number that contains 16 digits equal to the format of the real card number, or contains the number of digits that is the sum of information and the format of the real card number consisting of 16 digits or more or fewer depending on the card company.

The one-time payment-only number may not be discarded from the application after payment is completed, and each time payment is performed, the previously generated one-time payment-only number may be reused.

When the real card information is input to the application of the user terminal and is transmitted from the application to the card company server so that setting a link between the application of the user terminal and the real card is completed, the registered real card is ghosted. This means that the registered real card enters a temporal suspension state and is kept secure and payment is possible only with the one-time payment-only number generated by the application of the user terminal. It is impossible to use the ghosted real card with a card number that is leaked before the card is registered in the application of the user terminal. Even if payment is attempted by inputting the leaked card number in a handwritten manner from the outside, the ghosted real card is recognized as a card for which an accident is reported and it is thus unable to use the ghosted real card. Through this, damage caused by hacking or illegal theft may be prevented and a more enhanced transaction environment may be provided.

Figure 25:
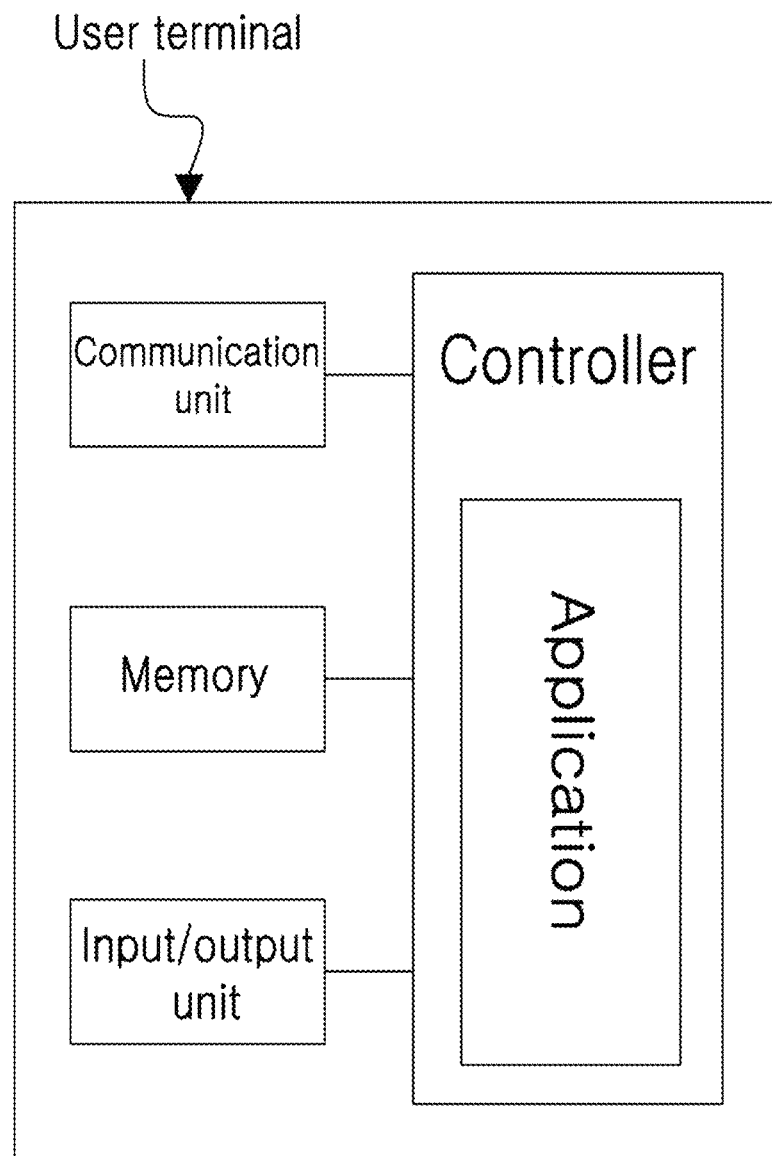
FIG. 25 is a block diagram illustrating a configuration of a user terminal of a payment system through generation of a one-time payment-only number of a real card linked with an application, according to an embodiment of the present disclosure.

In addition, in a case in which the product or service that the provider provides requires a tip fee, at the displaying of the transaction information and the signature input window to the user through the application of the user terminal, it may be set to output a tip selection window in addition to the signature input window on the screen of the application. When the tip selection window is set to be added, the tip selection window is output above the signature input window as shown in FIG. 25. As an example, options, 18%, 20%, 25%, and No tip, are shown, but may be changed by the setting of the application of the user terminal or by a request of the provider. When a desired amount of tip is selected and a signature is input, the signature of the user and tip setting information are transmitted together at the transmitting of the signature of the user from the application of the user terminal to the card company server, or at the transmitting of the signature of the user from the application of the user terminal to the VAN company server. In the transaction information, the tip amount may be displayed being distinguished from the product or service price, and the transaction may be conducted including the tip amount. Through this, the conventional inconvenient process of checking a tip on a receipt, confirming the tip by a provider, and thus conducting payment two times is solved with one request for payment and a signature. This may solve the user's anxiety due to exposure of the card, and the provider's difficulty in accounting for an amount received as a tip and in paying the amount.

When the user owns multiple real cards, the multiple different real cards of the user are set to be linked with the application of the user terminal. Among the multiple linked real cards, the user may choose any real card to be used for payment through the application.

The signature input window or the transaction receipt screen displayed to the user through the application of the user terminal may be displayed with an advertisement.

In addition, for handwriting input or reporting payment information to the outside, the generated one-time payment-only number may be output on the screen of the application of the user terminal, and the one-time transaction number may be reported to the outside through the screen or the transaction amount may be input in a handwritten manner so that transaction is conducted.

Figure 31:
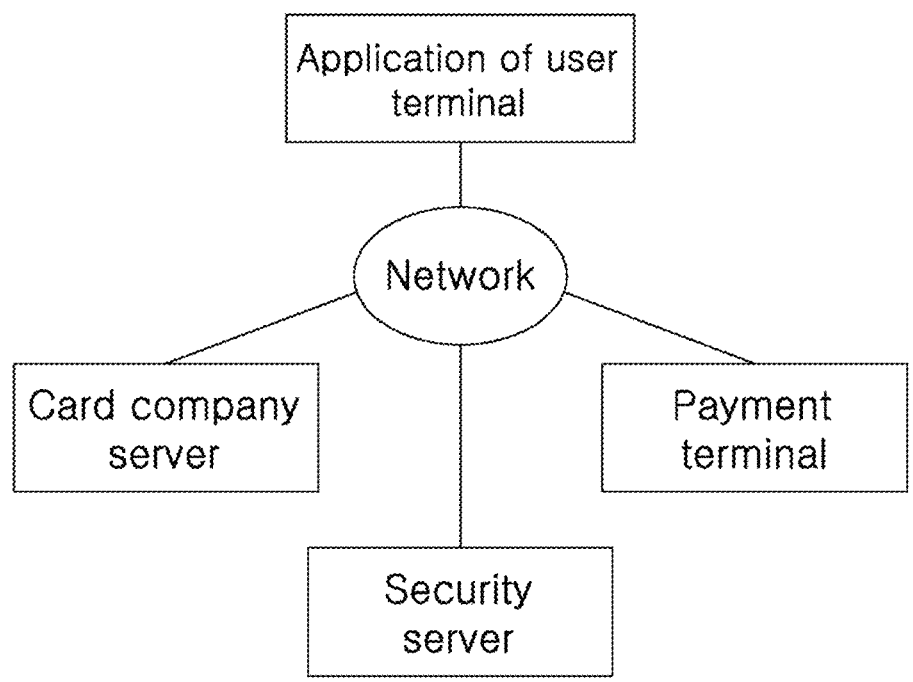
FIG. 31 is a block diagram illustrating a configuration in a case in which there is a security server of a payment system through generation of a one-time payment-only number of a real card linked with an application, according to an embodiment of the present disclosure.

As shown in FIG. 31, a payment system through generation of a one-time payment-only number of a real card linked with an application according to a first embodiment, in a transaction method of paying a purchase price of a product or a service by using the real card, includes: a payment terminal to which a provider inputs transaction information, such as a payment amount, the payment terminal being configured to transmit the transaction information and a card number of the real card to a card company server to make a request for transaction approval when the payment terminal recognizes the real card of a user, and receive notification of transaction approval from the card company server to complete payment; the card company server configured to generate the one-time payment-only number when the request for transaction approval is received from the payment terminal or authenticate and share the one-time payment-only number generated by the application of a user terminal, transmit the transaction information to the application of the user terminal, make a request to the user for confirmation and a signature, and transmit notification of payment completion and of transaction approval to the user terminal and the payment terminal when the signature of the user is received from the user terminal; and the user terminal configured to display the transaction information and a signature input window to the user through the application when the transaction information and the request for the signature are received from the card company server through the application linked with the card company server, transmit the signature of the user to the card company server through the application when the signature of the user is input, and output a receipt to a screen through the application when notification of payment completion is received from the card company server.

Figure 32:
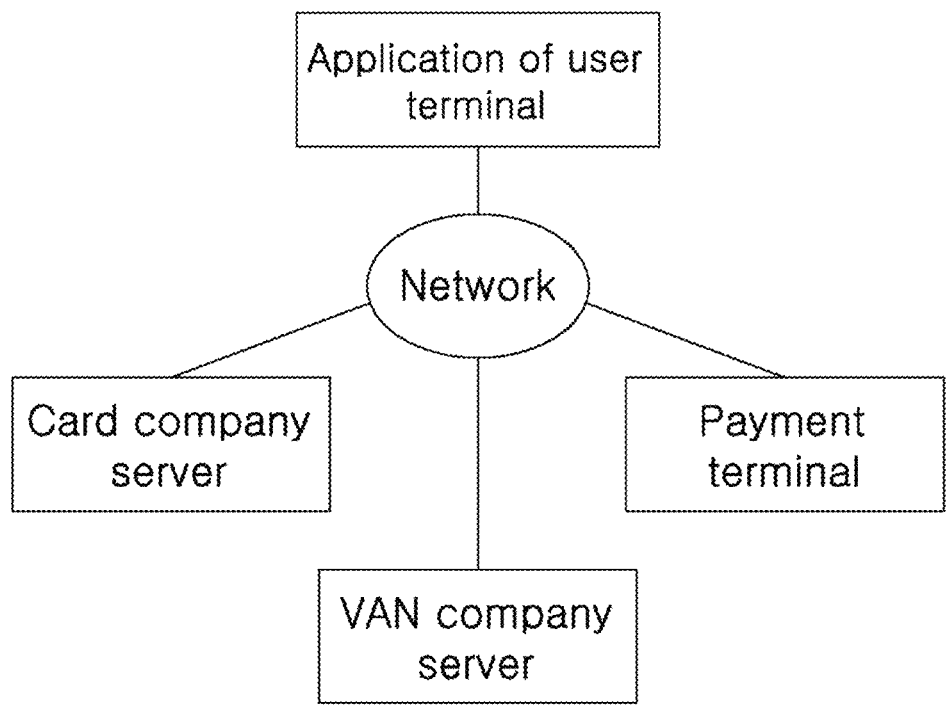
FIG. 32 is a block diagram illustrating a configuration in a case in which there is a VAN company server of a payment system through generation of a one-time payment-only number of a real card linked with an application, according to an embodiment of the present disclosure.

As shown in FIG. 32, a payment system through generation of a one-time payment-only number of a real card linked with an application according to a second embodiment, in a transaction method of paying a purchase price of a product or a service by using the real card, includes: a payment terminal to which a provider inputs transaction information, such as a payment amount, the payment terminal being configured to transmit the transaction information and a card number of the real card to a card company server to make a request for transaction approval when the payment terminal recognizes the real card of a user, and receive notification of transaction approval from the card company server to complete payment; a security server configured to be linked with the application of a user terminal, receive the card number of the real card and the transaction information from the card company server, be requested to generate the one-time payment-only number, generate the one-time payment-only number or authenticate and share the one-time payment-only number generated by the application, and transmit the one-time payment-only number to the card company server; the card company server configured to make a request to the security server for generation of the one-time payment-only number when the card number of the real card, the transaction information, and the request for transaction approval are received from the payment terminal, transmit the transaction information to the application of the user terminal when the one-time payment-only number is received from the security server, make a request to the user for confirmation and a signature, and transmit an approval number and notification of payment completion and transaction approval to the user terminal and the payment terminal when the signature of the user is received from the user terminal; and the user terminal configured to display the transaction information and a signature input window to the user through the application when the transaction information and the request for the signature are received from the card company server through the application linked with the security server and the card company server, transmit the signature of the user to the card company server through the application when the signature of the user is input, and output a receipt to a screen through the application when notification of payment completion is received from the card company server.

As shown in FIG. 33, a payment system through generation of a one-time payment-only number of a real card linked with an application according to a third embodiment, in a transaction method of paying a purchase price of a product or a service by using the real card, includes: a payment terminal to which a provider inputs transaction information, such as a payment amount, the payment terminal being configured to transmit the transaction information to a VAN company server to make a request for transaction approval when the payment terminal recognizes the real card of a user, and receive notification of transaction approval from the VAN company server to complete payment; the VAN company server configured to transmit the transaction information to the application of the user terminal and make a request to the user for confirmation and a signature when the transaction information and the request for transaction approval are received from the payment terminal, transmit the transaction information and the signature of the user to the card company server when the signature of the user is received from the user terminal, and transmit notification of payment completion to the user terminal and the payment terminal when an approval number and notification of transaction approval are received from the card company server; the card company server configured to generate and transmit the one-time payment-only number to the application when a request for generation of the one-time payment-only number is received from the application or authenticate and share the one-time payment-only number generated by the application, and transmit the approval number to the VAN company server and give notification of transaction approval when the transaction information, the signature of the user, and the request for transaction approval are received from the VAN company server; and the user terminal configured to make a request to the card company server for the one-time payment-only number through the application, display the transaction information and a signature input window to the user through the application when the transaction information and the request for the signature are received from the VAN company server through the application, transmit the signature of the user to the VAN company server through the application when the signature of the user is input, and output a receipt to a screen through the application when notification of payment completion is received from the VAN company server.

Each element of the payment system through generation of the one-time payment-only number of the real card linked with the application will be described in more detail as follows.

Figure 26:
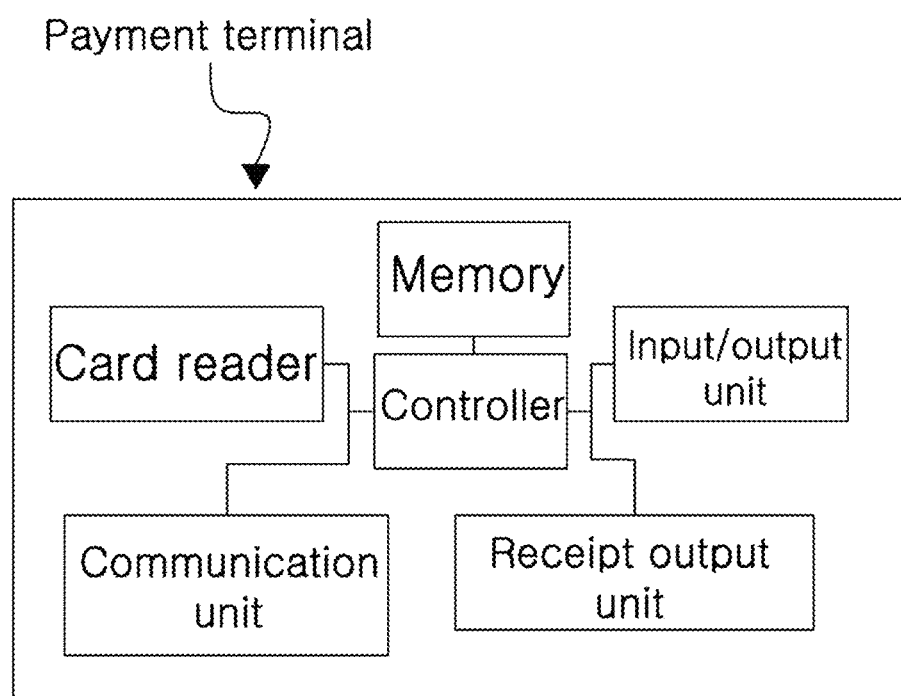
FIG. 26 is a block diagram illustrating a configuration of a payment terminal of a payment system through generation of a one-time payment-only number of a real card linked with an application, according to an embodiment of the present disclosure.

As shown in FIG. 26, the user terminal functioning as described above may include: a communication unit connected to a network for communication; a memory for storing therein setting information of an application; an input/output unit for inputting a signature, confirmation of selection on various selection windows of the application output on a screen, and a real card number, and for outputting the application on the screen; and a controller executing the application and controlling each element.

Figure 27:
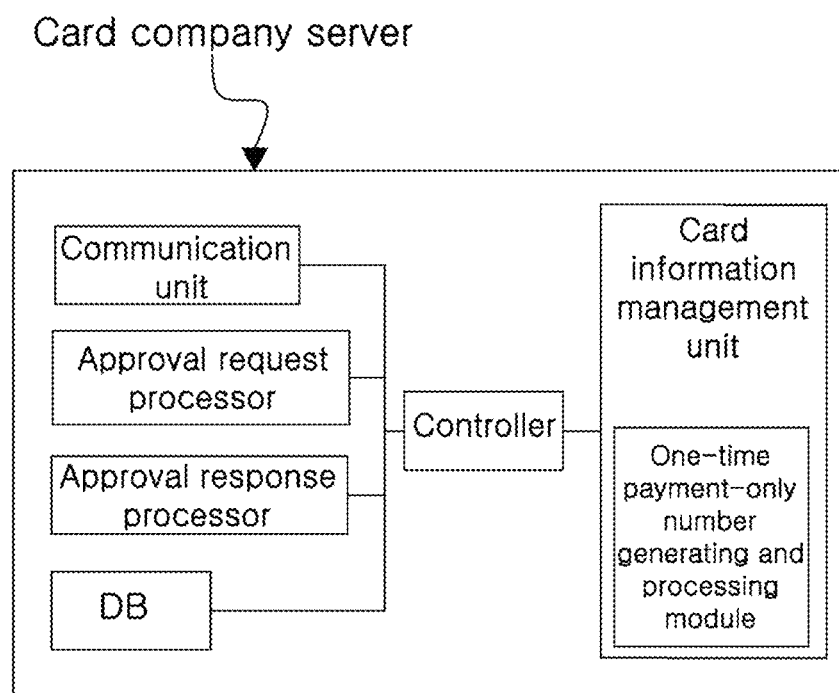
FIG. 27 is a block diagram illustrating a configuration of a card company server of a payment system through generation of a one-time payment-only number of a real card linked with an application, according to an embodiment of the present disclosure.

As shown in FIG. 27, the payment terminal functioning as described above may include: a card reader recognizing a real card and reading a real card number; an input/output unit for inputting transaction information, such as a transaction amount, and for outputting information related to transaction on a screen; a receipt output unit outputting a receipt when transaction is approved and completed; a communication unit connected to a card company server, a VAN company server, and a security server through network communication; a memory for storing therein a list of sale products, prices, or remaining quantities; and a controller controlling each element so that each element operates normally.

Figure 28:
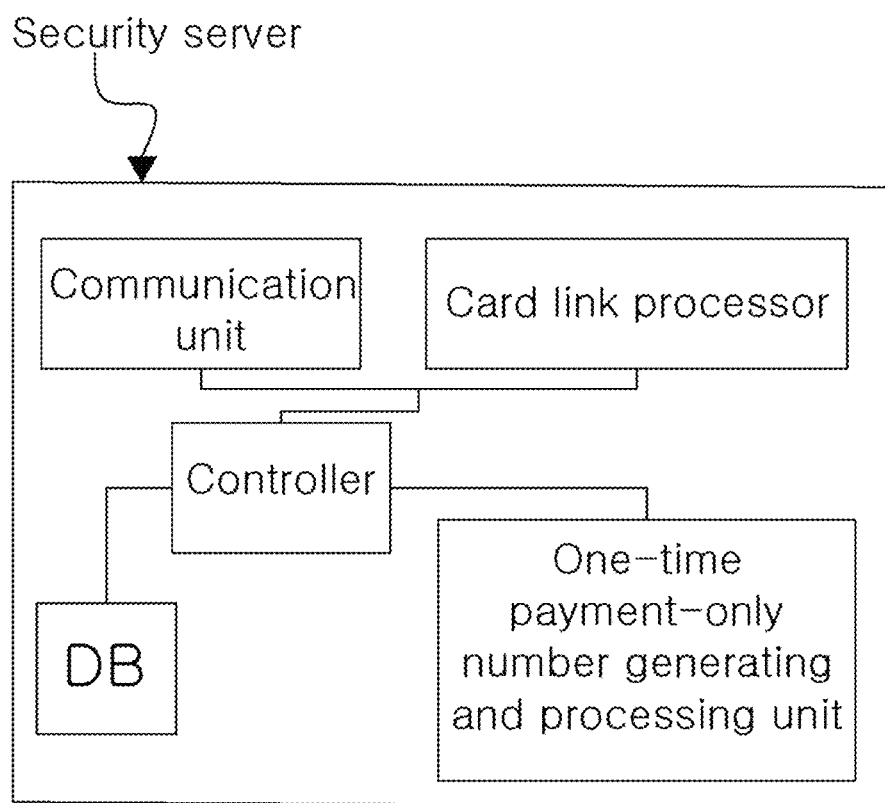
FIG. 28 is a block diagram illustrating a configuration of a security server of a payment system through generation of a one-time payment-only number of a real card linked with an application, according to an embodiment of the present disclosure.

As shown in FIG. 28, the card company server functioning as described above may include: a card information management unit loading card information, such as a card number, user information, a limit amount, and an expiration date stored in a DB, and managing application-linked card and suspended card setting, the card information management unit including a one-time payment-only number generating and processing module that generates or authenticates a one-time payment-only number; an approval request processor requesting or confirming transaction information and a signature, and checking whether they match linked real card information to determine whether to approve transaction; an approval response processor transmitting information on whether the approval request processor has approved transaction and payment is completed, to a payment terminal and a user terminal, and applying a result thereof to the DB; a communication unit connecting the card company server to the user terminal, the payment terminal, a security server, and a VAN company server through network communication; the DB for storing therein various types of the card information, the user information, and card usage history; and a controller controlling each element.

Figure 29:
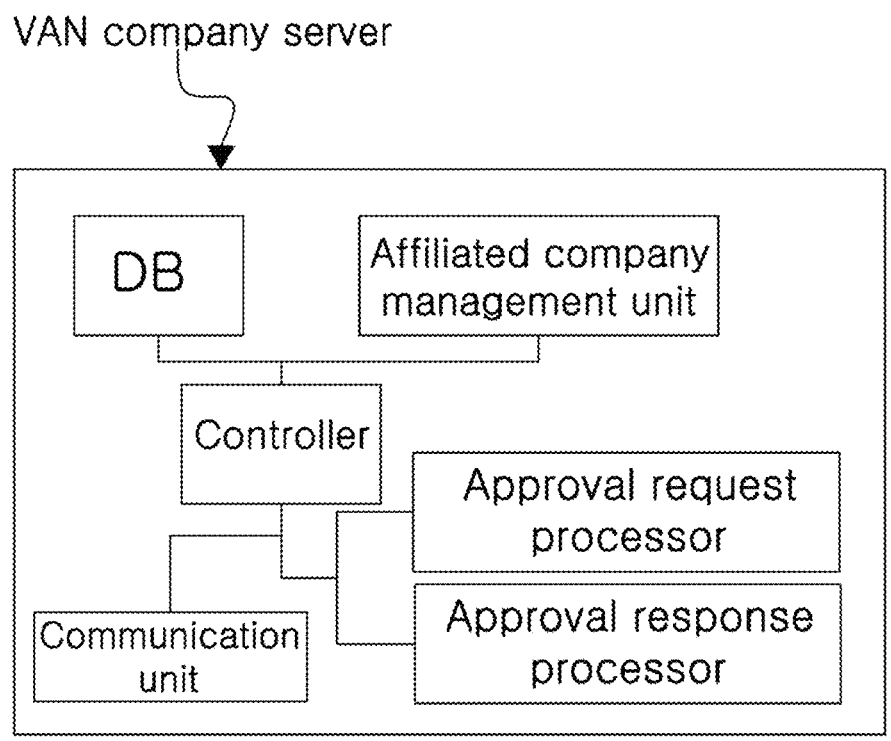
FIG. 29 is a block diagram illustrating a configuration of a VAN company server of a payment system through generation of a one-time payment-only number of a real card linked with an application, according to an embodiment of the present disclosure.

As shown in FIG. 29, the security server functioning as described above may include: a card link processor storing real card information linked with an application, sharing details of link with a card company server, and requesting and managing suspension setting; a one-time payment-only number generating and processing unit generating a one-time payment-only number requested, or authenticating and sharing the generated one-time payment-only number, and loading or applying limit amount setting; a communication unit connecting the security server to a user terminal, a payment terminal, the card company server, and a VAN company server through network communication; a DB for storing therein linked card information, application user information, and a one-time payment-only number that is stored in a restorable form after payment is completed; and a controller controlling each element.

Figure 30:
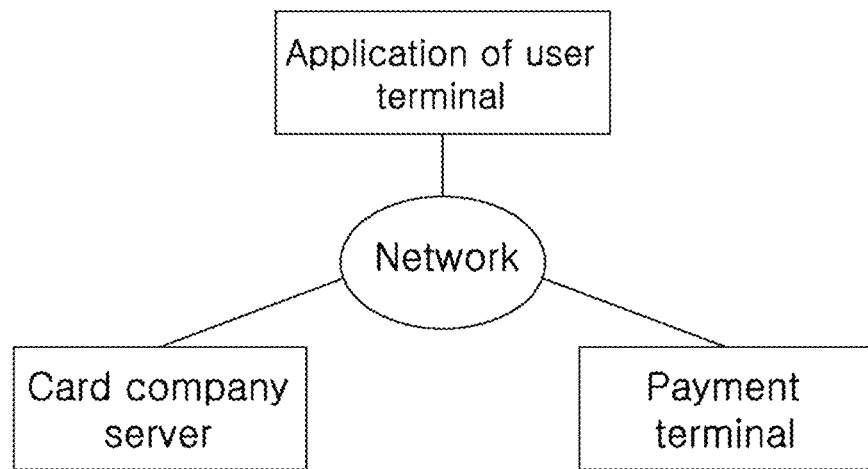
FIG. 30 is a block diagram illustrating a configuration in a case in which there is only a card company server of a payment system through generation of a one-time payment-only number of a real card linked with an application, according to an embodiment of the present disclosure.

As shown in FIG. 30, the VAN company server functioning as described above may include: an affiliated company management unit managing a payment terminal of an affiliated company; an approval request processor processing an approval request received from the payment terminal, making a request to a user terminal for a signature, and making a request to a card company server for transaction approval; an approval response processor giving notification of the transaction approval from the card company server to the payment terminal and the user terminal; a communication unit connecting the VAN company server to the user terminal, the payment terminal, the card company server, and a security server through network communication; a DB for storing therein affiliated company information and transaction history of an affiliated company; and a controller controlling each element.

Figure 17:
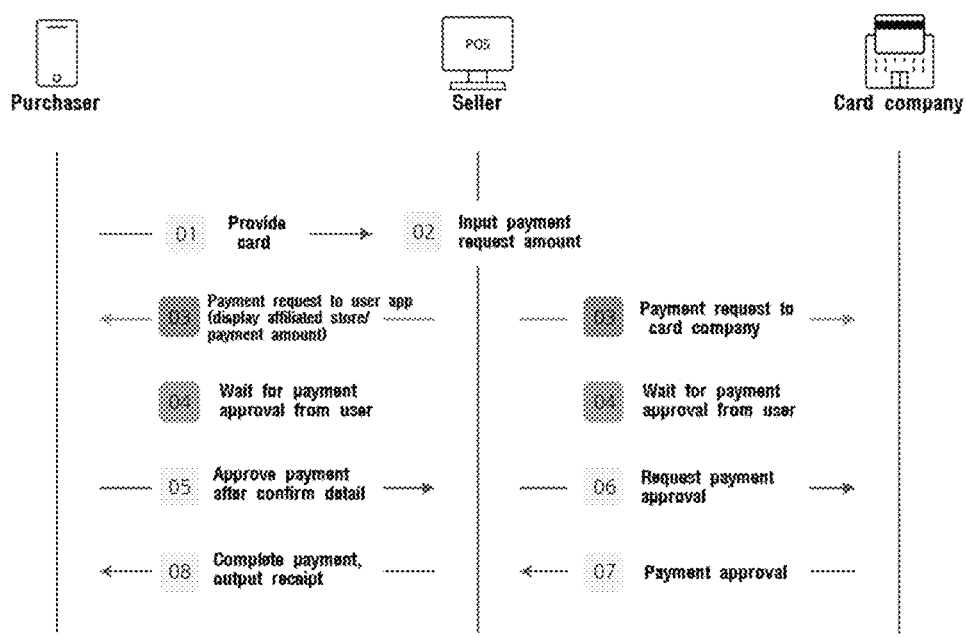
FIG. 17 is a flowchart illustrating a case in which payment is performed with only a simplified request to a card company server, in a payment method through generation of a one-time payment-only number of a real card linked with an application, according to an embodiment of the present disclosure.
Figure 18:
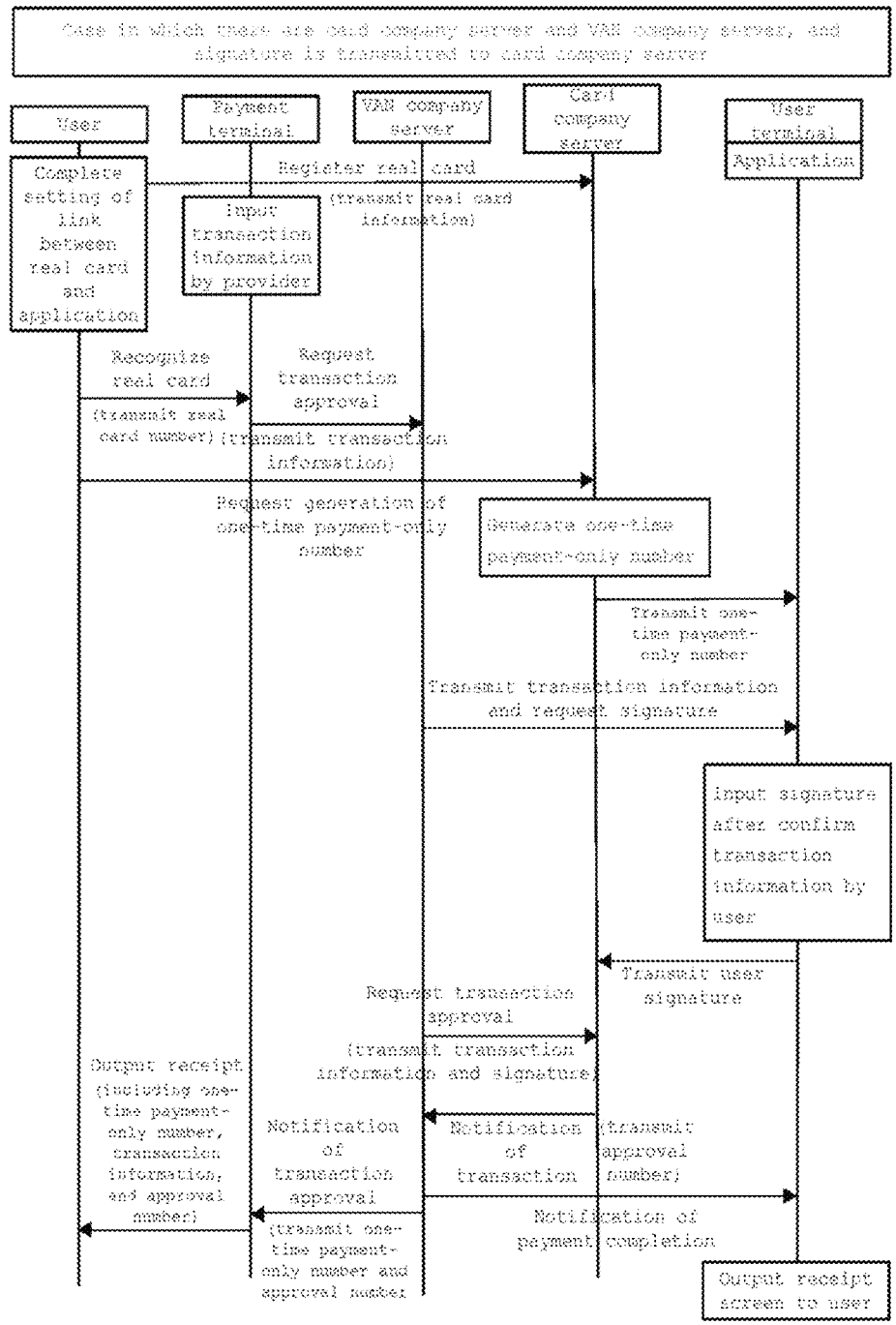
FIG. 18 is a flowchart illustrating a case in which there are a card company server and a VAN company server and a user signature is transmitted to a card company server, in a payment method through generation of a one-time payment-only number of a real card linked with an application, according to an embodiment of the present disclosure.

In a payment method through generation of a one-time payment-only number of a real card linked with an application according to a fourth embodiment of the present disclosure, as shown in FIG. 17, payment may be completed by inputting only the signature to the application of the user terminal.

The payment method may include: inputting real card information, such as a real card number, of a user to the application installed on a user terminal, and transmitting the real card information from the application to a card company server to complete a link between the application of the user terminal and the real card; inputting, by the application of the user terminal, a payment request amount to the card company server; inputting transaction information, such as a payment amount for the product or the service that the user purchases from a provider, to a payment terminal; recognizing the real card of the user by the payment terminal, and transmitting a payment signal from the real card to the payment terminal; transmitting the payment signal and the transaction information from the payment terminal to the card company server, and making a request for transaction approval from the payment terminal to the card company server; transmitting the transaction information from the payment terminal to the application of the user terminal, making a request to the user for confirmation and a signature, and displaying the transaction information and a signature input window to the user through the application of the user terminal; inputting the signature of the user to the signature input window of the application of the user terminal; transmitting the signature of the user from the application of the user terminal to the payment terminal; transmitting the signature of the user and a request for payment approval from the payment terminal to the card company server; checking, by the card company server, the signature of the user and card information and transmitting a payment approval signal to the payment terminal; completing payment in the payment terminal and outputting a receipt to a screen of the application of the user terminal; and outputting a transaction receipt to be provided to the user from the payment terminal.

In the payment method through generation of a one-time payment-only number of a real card linked with an application according to the fourth embodiment, when a payment terminal recognizes a card and transmits transaction information and a request for approval to a card company server, the payment terminal and the card company server are connected and a payment request waiting state is maintained. Afterward, the detail of the request for payment is displayed on the user application, and when the user inputs a signature and approves the payment, the card company server and the payment terminal that have been waiting complete the payment. According to this method, in the payment process, there are few requests from the application of the payment terminal or the user terminal to the card company server and payment is performed simply with a signature and approval through the application of the user terminal.

In addition, in the process of inputting the signature to the signature input window, an advertisement for an affiliated store is output to the screen of the application. In the process of outputting the receipt to the screen of the application after payment is completed, an advertisement for an affiliated store is output, so that advertising effect is obtained.

Taking, as an example, the actual case in which the payment method and system through generation of a one-time payment-only number of a real card linked with an application work in the payment terminal and the user terminal, the present disclosure will be described in more detail as follows.

Figure 11:
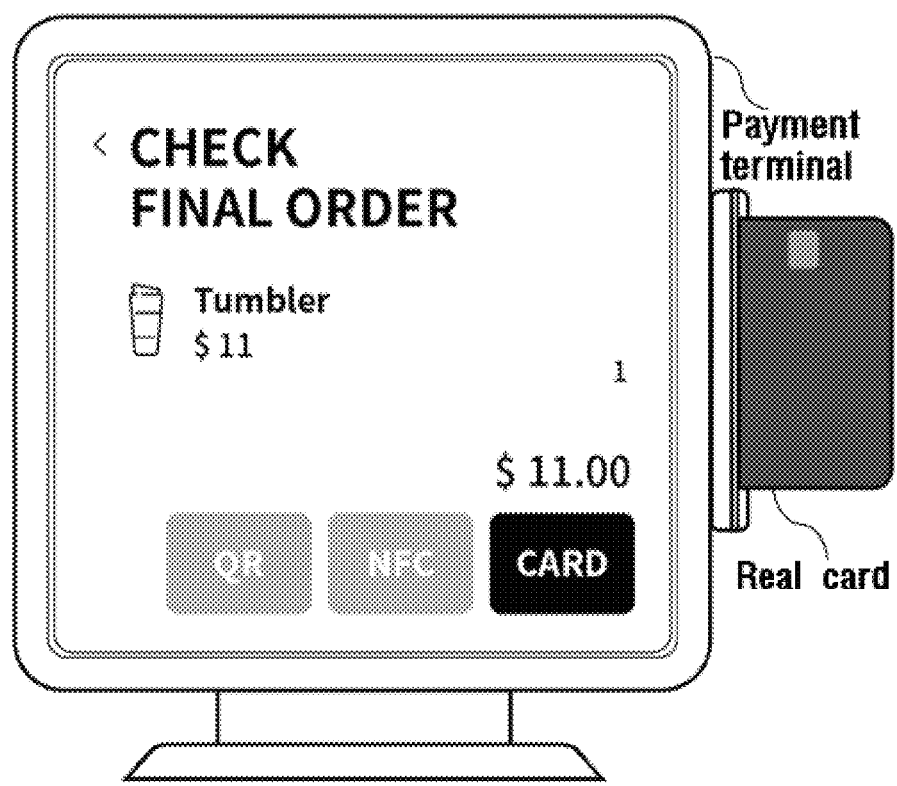
FIG. 11 is an exemplary diagram illustrating a step of recognizing a real card by a payment terminal, in a payment method through generation of a one-time payment-only number of a real card linked with an application, according to an embodiment of the present disclosure.

At the steps in which the provider inputs the transaction information and the payment terminal recognizes the real card, as shown in FIG. 11, the provider inputs the transaction information, such as the payment amount, and the payment item, to the payment terminal (for example, a POS terminal) and the real card is recognized by inserting the real card into the payment terminal or touching the real card to the payment terminal to transmit the card number of the real card to the payment terminal.

Figure 12:
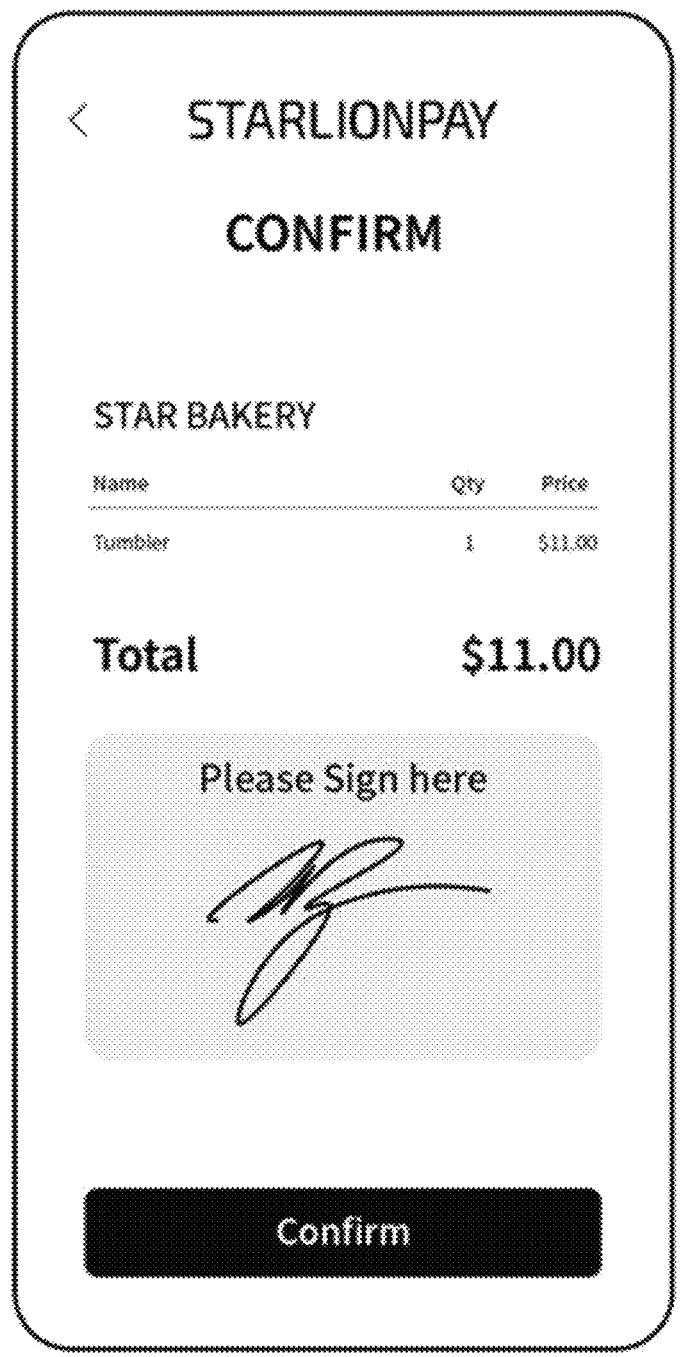
FIG. 12 is an exemplary diagram illustrating a user signature input window of a display screen of an application of a user terminal, in a payment method through generation of a one-time payment-only number of a real card linked with an application, according to an embodiment of the present disclosure.

At the step in which the user signature input window is shown on the application of the user terminal and the signature is completed, as shown in FIG. 12, for example, the name of the application "STARLIONPAY" is displayed at the upper part of the screen on which the application of the user terminal is running. The word "CONFIRM" for requesting the user to confirm the transaction information is displayed. The transaction information, such as the payment item and the payment amount, is displayed. The signature input window to which the signature is to be input is displayed as a box with the phrase "Please Sign Here" at the upper part inside the box. After the signature is input, a confirmation button for transmitting the user signature to the VAN company server is displayed as a box with the word "Confirm" at the middle inside the box. In addition, at the step in which the user signature input window is shown on the application of the user terminal and the signature is completed, an advertisement image or video may be displayed at one side or the background on the screen of the application of the user terminal.

Figure 13:
FIG. 13 is an exemplary diagram illustrating a payment completion receipt of a display screen of an application of a user terminal, in a payment method through generation of a one-time payment-only number of a real card linked with an application, according to an embodiment of the present disclosure.

Regarding the payment completion receipt displayed on the application of the user terminal, as shown in FIG. 13, for example, the name of the application "STARLIONPAY" may be displayed at the upper part of the screen on which the application of the user terminal is running. The word "APPROVED" for informing the user of payment completion may be displayed. The transaction information, such as the payment item and the payment amount, may be displayed. An advertisement may be displayed at the lower part of the screen.

Figure 14:
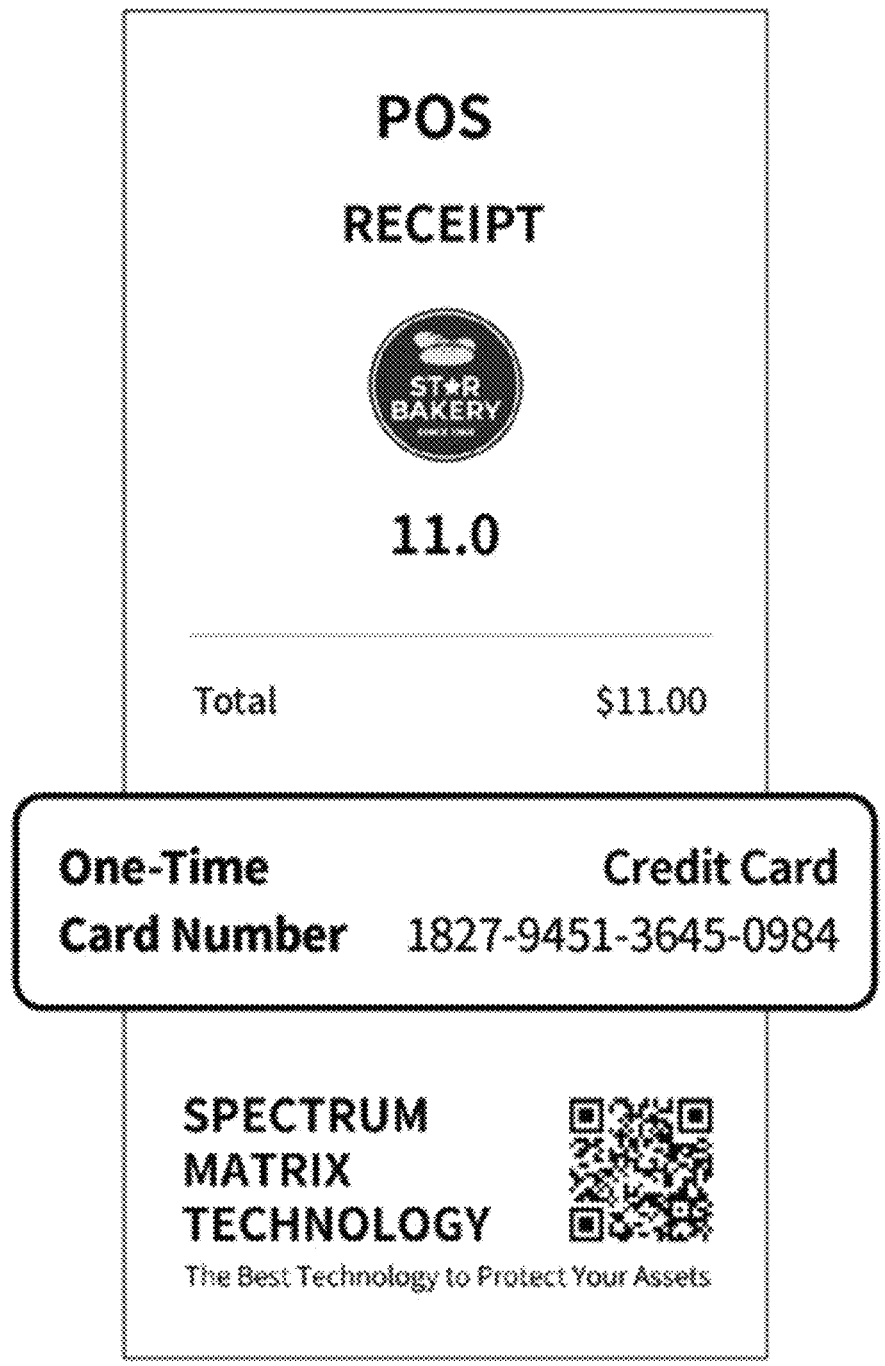
FIG. 14 is an exemplary diagram illustrating a receipt output from a payment terminal, in a payment method through generation of a one-time payment-only number of a real card linked with an application, according to an embodiment of the present disclosure.

In the transaction receipt output from the payment terminal, as shown in FIG. 14, for example, the transaction information, such as the affiliated store name of the provider and the transaction amount, and the one-time payment-only number may be shown. At the lower part of the receipt, an advertisement, such as the name of the company to be promoted and a QR code for accessing the company homepage, may be shown.

Figure 15:
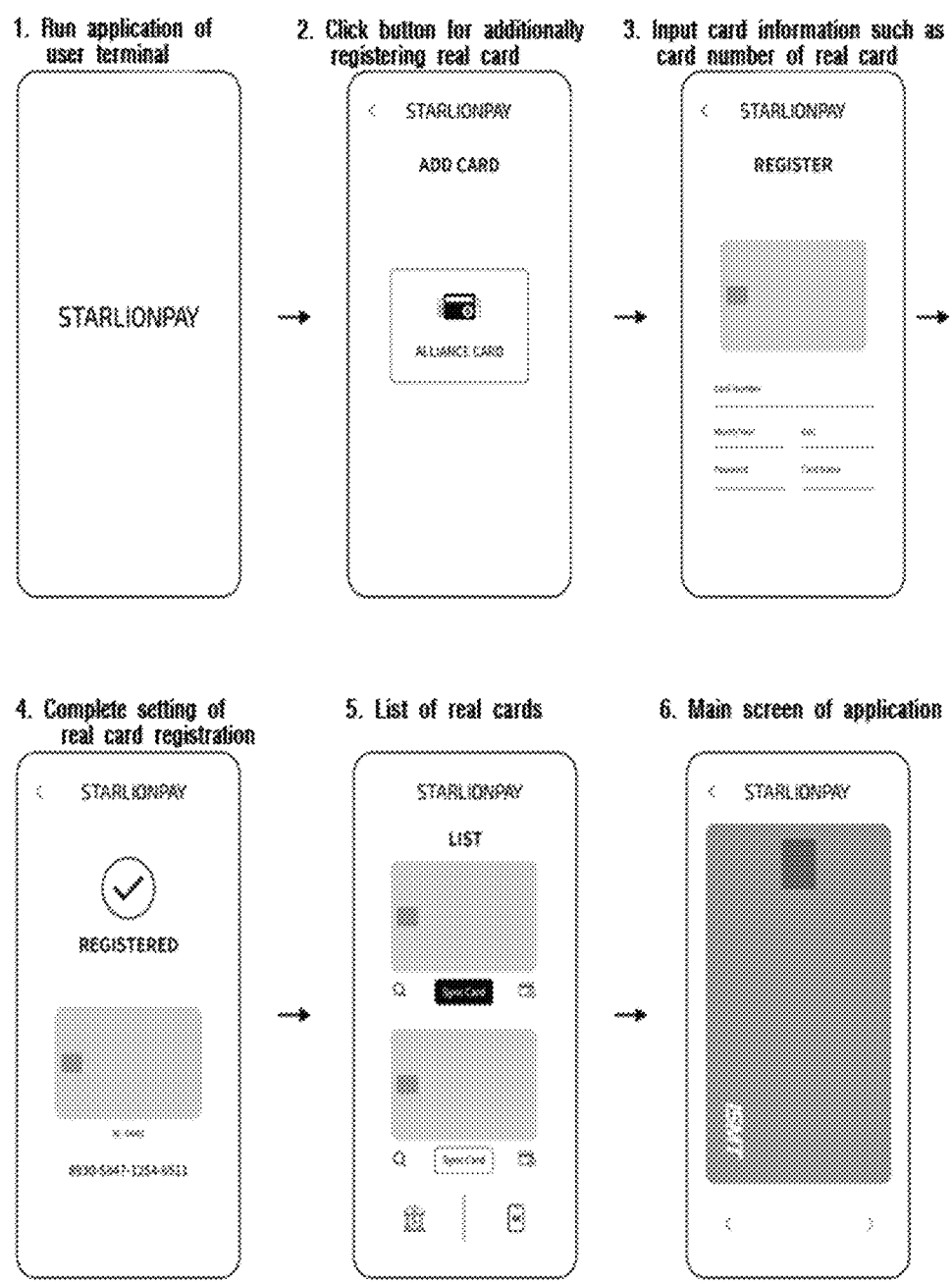
FIG. 15 is an exemplary diagram illustrating an actual screen for a process of registering a real card in an application of a user terminal, in a payment method through generation of a one-time payment-only number of a real card linked with an application, according to an embodiment of the present disclosure.

In the process of registering the real card in the application of the user terminal, as shown in FIG. 15, for example, the application (STARLIONPAY in FIG. 15) of the user terminal is run. A button (ALLIANCE CARD in FIG. 15) for registering a real card additionally is clicked. Real card information, such as a card number, an expiration date, a CVC number, a password, and an owner name of the real card, is input. The real card information is transmitted to the card company server, and real card registration setting is completed. Afterward, a list of real cards may be viewed. When multiple real cards are registered, a synchronization button (Sync Card in FIG. 15) for choosing the real card to be used for payment is clicked. Then, the link between the real card and the application is activated. When the synchronization button is clicked again, the link is deactivated.

Figure 16:
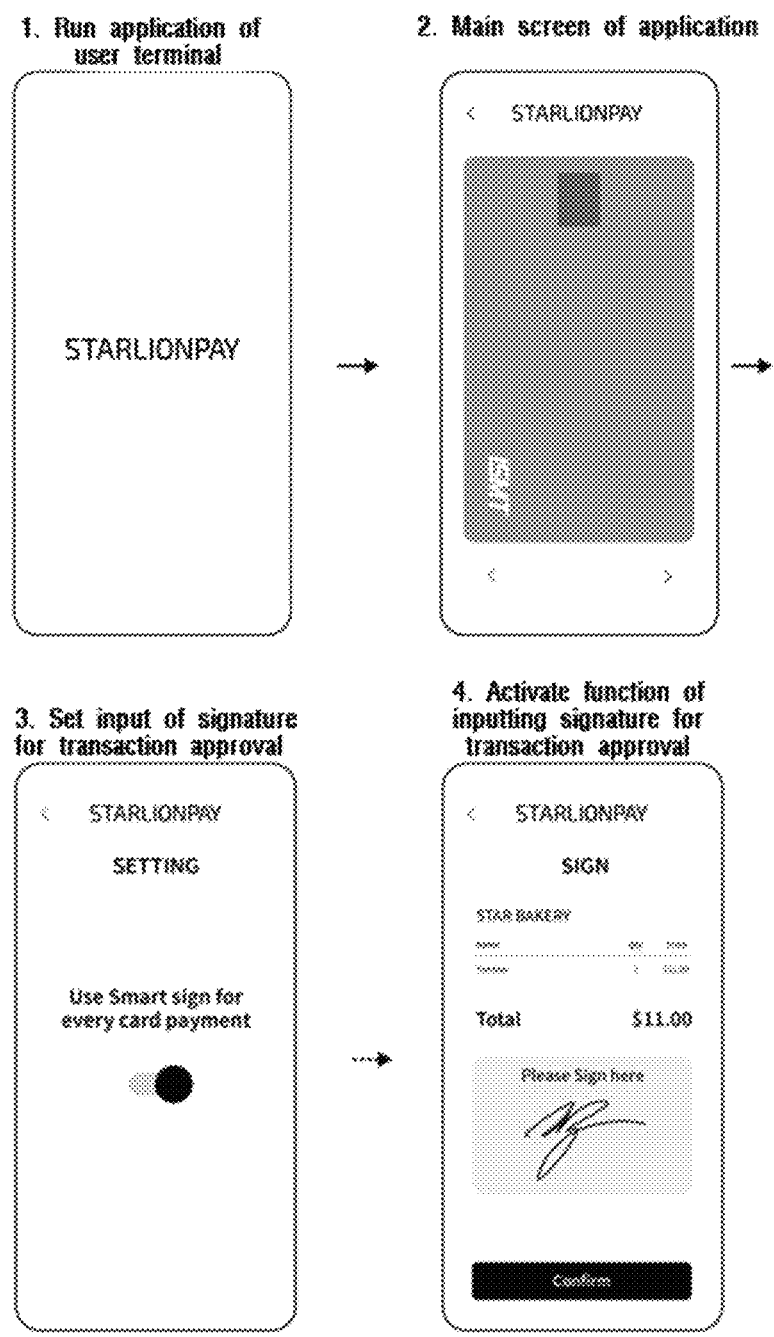
FIG. 16 is an exemplary diagram illustrating an actual screen for a process of activating or deactivating transaction approval signature input setting in an application of a user terminal, in a payment method through generation of a one-time payment-only number of a real card linked with an application, according to an embodiment of the present disclosure.

A function of activating or deactivating, depending on the user's choice, the setting of whether to perform the step of inputting the signature for transaction approval to the application of the user terminal may be added. As shown in FIG. 16, the application of the user terminal is run. Switching from a main screen of the application to a "SETTING" menu takes place, and by manipulating a selection button (Use Smart sign for every card payment in FIG. 16) for turning on or off an activation/deactivation function, a signature input function is activated so that transaction approval is achieved only when the user inputs the signature for transaction approval every transaction, or the signature input function is deactivated. When the signature input function is deactivated, the application is set such that the user's signature is automatically input, and the signature input window is thus not displayed to the user. The user uses the real card in the same manner as in the conventional usage method, and makes payment using the one-time payment-only number, whereby transaction security is enhanced.

In the case in which the provider is a particular affiliated store having a cooperation contract with the application of the user, the payment method may further include combining an affiliated store code with the one-time payment-only number when the one-time payment-only number and the approval number are transmitted from the card company server, the security server, and the VAN company server to the payment terminal, thereby enhancing security. Through combination of the one-time payment-only number and the affiliated store code, it is possible to distinguish the particular affiliated store in which the application of the user is registered from other providers. Thus, even when a one-time payment-only number is stolen because of hacking, payment is impossible for stores other than the affiliated store, thereby preventing abuse. In addition, when payment with an affiliated store code registered in a blacklist is intended to be performed, a warning wording "unregistered affiliated store" is output as a red label to the application of the user and a reporting button is generated, thus enabling quick report action. This may help in preventing illegal use of the card, in managing an affiliated store, and in determining the details of use.

If the VAN company server and the application are managed by the same subject in an integrated manner, the payment process is performed more organically and easily. If the management subject of the VAN company server and the management subject of the application differ, a particular module that enables a connection between the VAN company server and the application is installed so that a payment method and system through generation of a one-time payment-only number of a real card linked with an application according to an embodiment of the present disclosure work smoothly.

The preferred embodiments of the present disclosure have been disclosed in the detailed description with reference to with the accompanying drawings. Although particular terms are used herein, they are merely intended to describe the present disclosure without limiting the meaning and the scope of the disclosure described in the claims. Therefore, it will be appreciated by those skilled in the art that various modifications and equivalent embodiments may be made in these embodiments. Accordingly, the scope of the disclosure will need to be defined in the accompanying claims.

What is claimed is:

1. A payment method through generation of a one-time payment-only number of a real card linked with an application, in a transaction method of paying a purchase price of a product or a service by using the real card, the payment method comprising:
   inputting real card information of a user to the application installed on a user terminal, and transmitting the real card information from the application to a card company server to complete setting of a link between the application of the user terminal and the real card;
   inputting transaction information to a payment terminal;
   recognizing the real card of the user by the payment terminal, and receiving the real card number from the real card to the payment terminal;
   transmitting the real card number and the transaction information from the payment terminal to the card company server, and making a request for transaction approval from the payment terminal to the card company server;
   receiving the randomly generated one-time payment-only number from the card company server wherein the one-time payment-only number is distinct from the information of the real card and replaces the real card information for use for transaction information and approval;
   receiving the transaction information from the card company server by the application of the user terminal,
   requesting user confirmation and a signature, and displaying the transaction information and a signature input window to the user through the application of the user terminal;
   receiving the signature of the user which is input by the user to the signature input window of the application of the user terminal;
   transmitting the signature of the user from the application of the user terminal to the card company server;
   receiving approval of the transaction and an approval number and the one-time payment-only number from the card company server to the application of the user terminal after the card company server approves transaction, giving notification of payment completion, and outputting a transaction receipt screen to the user terminal;

and outputting a transaction receipt to be provided to the user from the payment terminal, and wherein the real card is a real synchronization card that is formed to be linked with the application from the time of initial issuance.

2. The payment method of claim 1, wherein the one-time payment-only number that is used for transaction approval with respect to the real card number and the transaction information is generated by the application; and additionally comprising:

transmitting the one-time payment-only number generated by the application to the card company server, and making a request to the card company server for authentication; and receiving the authenticated one-time payment-only number from the card company server.

3. The payment method of claim 1, wherein the one-time payment-only number is generated as a one-time payment-only number having a set limit amount in such a manner that the limit amount payable is set to be the payment amount for the product or the service that the user purchases from the provider.

4. The payment method of claim 1, wherein the one-time payment-only number is generated as a one-time payment-only number having a set limit amount payable, and whether to apply setting of the limit amount is determined at a step in which the user confirms the transaction information and inputs the signature, and after the transmitting of the signature of the user from the application of the user terminal to the card company server, the following is performed:

the application of the user terminal receives a new card company server generated one-time payment-only number having the set limit amount, wherein the one-time payment-only number having the set limit amount was used for transaction approval, and wherein the application of the user terminal receives the approval number and gives notification of payment completion, and the transaction receipt screen is output to the user terminal.

5. The payment method of claim 4, wherein a size of the limit amount is automatically set to be the same amount each time as the amount in the transaction information that the provider inputs.

6. The payment method of claim 1, wherein the real card is a general credit card or check card.

7. The payment method of claim 1, wherein the one-time payment-only number is a one-time card number in the same format as the real card number.

8. The payment method of claim 1, wherein a plurality of the real cards of the user different from each other is set to be linked with the application of the user terminal, and among the plurality of the linked real cards, the user chooses any real card to be used for payment through the application.

9. The payment method of claim 1, wherein the application is set such that the signature of the user is automatically input, and the signature input window is not displayed to the user.

10. The payment method of claim 1, wherein the signature input window or the transaction receipt displayed to the user through the application of the user terminal is displayed with an advertisement.

11. The payment method of claim 1, wherein when the real card information is input to the application installed on the user terminal and is transmitted from the application of the user terminal to the card company server so that the link between the application of the user terminal and the real card is set, and a registered card enters a temporal suspension state and payment is performed only with the one-time payment-only number generated by the application of the user terminal.

12. The payment method of claim 1, further comprising:

for a particular affiliated store provider, combining the one-time payment-only number with an affiliated store code when the provider is a particular affiliated store and the one-time payment-only number and the approval number are received by the payment terminal.

13. The payment method of claim 12, wherein for payment with the affiliated store code registered in a blacklist, a warning wording is output to the application of the user and a reporting button is generated.

14. The payment method of claim 1, wherein at the displaying of the transaction information and the signature input window to the user through the application of the user terminal, a tip selection window for selecting a tip to be paid to the provider is additionally output and a selected tip amount is additionally included in the transaction information.

15. A payment method through generation of a one-time payment-only number of a real card linked with an application, in a transaction method of paying a purchase price of a product or a service by using the real card, the payment method comprising:

inputting real card information of a user to the application installed on a user terminal, transmitting the real card information from the application to a security server, which then transmits the real card information to a card company server to complete setting of a link between the application of the user terminal and the real card;

inputting transaction information to a payment terminal;

recognizing the real card of the user by the payment terminal, and transmitting the real card number from the real card to the payment terminal;

transmitting the real card number and the transaction information from the payment terminal to the card company server, and making a request for transaction approval from the payment terminal to the card company server;

wherein the real card number and the transaction information is received by the security server from the card company server, and requesting generation of the one-time payment-only number;

receiving the randomly generated one-time payment-only number from the security server, wherein the one-time payment-only number is distinct from the information of the real card and is used for transaction information and transaction approval;

wherein the one-time payment-only number is transmitted from the security server to the card company server;

receiving the transaction information from the card company server to the application of the user terminal, requesting user confirmation and a signature, and displaying the transaction information and a signature input window to the user through the application of the user terminal;

receiving the signature of the user which is input by the user to the signature input window of the application of the user terminal;

transmitting the signature of the user from the application of the user terminal to the card company server;

receiving approval of the transaction from the card company server, to the application of the user terminal for notification of payment completion, and outputting a transaction receipt screen to the user terminal;

receiving the one-time payment-only number and the approval number from the card company server to the payment terminal, and receiving notification of transaction approval from the card company server to the payment terminal; and outputting a transaction receipt to the user from the payment terminal.

16. The payment method of claim 15, wherein the one-time payment-only number that is used for transaction approval with respect to the real card number and the transaction information is generated by the application;

transmitting the one-time payment-only number generated by the application to the security server, and making a request for authentication; and receiving the authenticated one-time payment-only number from the security server.

17. The payment method of claim 15, wherein the one-time payment-only number is generated as a one-time payment-only number having a set limit amount payable, and whether to apply setting of the limit amount is determined at a step in which the user confirms the transaction information and inputs the signature, and transmitting of the signature of the user from the application of the user terminal to the card company server, after receiving notification from the card company server of transaction approval and the approval number having the set limit amount from the card company server as a result of the following being performed:

the card company server requests the security server to generate the one-time payment-only number having the set limit amount;

the security server generates the one-time payment-only number having the set limit amount;

the security server transmits the one-time payment-only number having the set limit amount to the card company server;

the card company server approves transaction afterward, and gives notification of payment completion to the application of the user terminal, and the transaction receipt screen is output to the user terminal;

the one-time payment-only number having the set limit amount and the approval number having the set limit amount are transmitted from the card company server to the payment terminal, and the card company server gives notification of transaction approval to the payment terminal; and providing the transaction receipt to the user from the payment terminal.

18. A payment method through generation of a one-time payment-only number of a real card linked with an application, in a transaction method of paying a purchase price of a product or a service by using the real card, the payment method comprising:

inputting real card information of a user to the application installed on a user terminal, and transmitting the real card information from the application to a card company server to complete setting of a link between the application of the user terminal and the real card;

inputting transaction information to a payment terminal;

recognizing the real card of the user by the payment terminal, and transmitting the real card number from the real card to the payment terminal;

transmitting the transaction information from the payment terminal to a VAN company server, and making a request for transaction approval from the payment terminal to the VAN company server;

making a request for generation of the one-time payment-only number from the application of the user terminal to the card company server;

receiving the randomly generated one-time payment-only number from the card company server, wherein the one-time payment-only number is distinct from the information of the real card and is used for transaction information and transaction approval;

receiving the one-time payment-only number from the card company server to the application;

receiving the transaction information from the VAN company server to the application of the user terminal, making a request to the user for confirmation and a signature, and displaying the transaction information and a signature input window to the user through the application of the user terminal;

receiving the signature of the user which is input by the user to the signature input window of the application of the user terminal;

transmitting the signature of the user from the application of the user terminal to the VAN company server;

wherein the one-time payment-only number, the transaction information, and the signature of the user is transmitted from the VAN company server to the card company server, and a request for transaction approval is made from the VAN company server to the card company server;

wherein approval of the transaction and an approval number from the card company server is received by the VAN company server after the card company server approves transaction, and notification of transaction approval is provided to the VAN company server from the card company server;

receiving notification of payment completion from the VAN company server to the application of the user terminal, and outputting a transaction receipt screen to the user terminal;

receiving the one-time payment-only number and the approval number from the VAN company server to the payment terminal, and receiving notification of transaction approval from the VAN company server to the payment terminal; and outputting a transaction receipt to be provided to the user from the payment terminal wherein in the VAN company server, a module that enables a connection with the application is installed.

19. The payment method of claim 18, wherein the the one-time payment-only number that is used for transaction approval with respect to the real card number and the transaction information is generated by the application;

transmitting the one-time payment-only number generated by the application to the card company server, and making a request for authentication; and receiving the authenticated one-time payment-only number from the card company server.

20. The payment method of claim 18, wherein the one-time payment-only number is generated as a one-time payment-only number having a set limit amount payable, and whether to apply setting of the limit amount is determined at a step in which the user confirms the transaction information and inputs the signature, and transmitting of the signature of the user from the application of the user terminal to the VAN company server, after receiving notification from the VAN company server of transaction approval and the approval number having the set limit amount from the VAN company server as a result of the following are performed:

the application of the user terminal requests the card company server to generate the one-time payment-only number having the set limit amount;

the card company server generates the one-time payment-only number having the set limit amount;

the card company server approves transaction, and transmits the one-time payment-only number having the set limit amount to the application;

the approval number having the set limit amount is transmitted from the card company server to the VAN company server, and the card company server gives notification of transaction approval to the VAN company server;

the VAN company server gives notification of payment completion to the application of the user terminal, and the transaction receipt screen is output to the user terminal;

the one-time payment-only number having the set limit amount and the approval number having the set limit amount are transmitted from the VAN company server to the payment terminal, and the VAN company server gives notification of transaction approval to the payment terminal; and providing the transaction receipt to the user from the payment terminal.

21. The payment method of claim 18, wherein the transmitting of the signature of the user from the application of the user terminal to the VAN company server is converted into transmitting the signature of the user from the application of the user terminal to the card company server.

* * * * *